US007411128B2

(12) United States Patent
Drotleff et al.

(10) Patent No.: US 7,411,128 B2
(45) Date of Patent: Aug. 12, 2008

(54) CABLE FEED-THROUGH AND CABLE FEED-THROUGH SYSTEM

(75) Inventors: Rolf Drotleff, Weil der Stadt (DE); Martin Zankl, Winnenden (DE)

(73) Assignee: Lapp Engineering & Co., Zug (CH)

( * ) Notice: Subject to any disclaimer, the term of this patent is extended or adjusted under 35 U.S.C. 154(b) by 0 days.

(21) Appl. No.: 11/528,494

(22) Filed: Sep. 26, 2006

(65) Prior Publication Data

US 2008/0073120 A1    Mar. 27, 2008

(51) Int. Cl.
 *H02G 15/02* (2006.01)
(52) U.S. Cl. .................................. 174/74 R; 174/77 R
(58) Field of Classification Search ............... 174/74 R, 174/78, 77 R, 84 R, 88 R
See application file for complete search history.

(56) References Cited

U.S. PATENT DOCUMENTS

| 5,545,854 A * | 8/1996 | Ishida ..................... 174/153 G |
| 6,053,456 A * | 4/2000 | Dispenza ..................... 248/56 |
| 6,575,474 B1 * | 6/2003 | Zimmer et al. .............. 277/603 |
| 6,627,817 B1 * | 9/2003 | Kortenbach ................ 174/74 R |
| 6,802,512 B2 * | 10/2004 | Muller et al. ................ 277/607 |

FOREIGN PATENT DOCUMENTS

| DE | 197 21 659 | 11/1998 |
| DE | 197 21 659 A1 * | 11/1998 |
| DE | 198 17 279 | 10/1999 |
| DE | 100 46 157 A1 * | 9/2000 |
| DE | 100 46 157 | 3/2002 |
| DE | 101 40 714 | 3/2003 |
| WO | 99/56368 | 11/1999 |

* cited by examiner

*Primary Examiner*—William H Mayo, III
(74) *Attorney, Agent, or Firm*—Lipsitz & McAllister, LLC

(57) ABSTRACT

A cable feed-through with an elastic sealing element having at least one cable feed-through channel is provided. The elastic sealing element is assembled from two sealing element parts separated by a dividing surface and has a feed-through member which comprises the at least one cable feed-through channel and inner sealing surfaces which can abut sealingly on at least one cable sheath. At least one holding element is provided, with which the two sealing element parts can be acted upon in such a manner that the inner sealing surfaces abut sealingly on the cable sheath and the sealing element parts abut sealingly on one another with their contact surfaces respectively bordering on the dividing surface.

40 Claims, 18 Drawing Sheets

CABLE FEED-THROUGH AND CABLE FEED-THROUGH SYSTEM

BACKGROUND OF THE INVENTION

The invention relates to a cable feed-through with a sealing element having at least one cable feed-through channel.

Cable feed-throughs of this type are known from the state of the art, wherein, in their case, the problem of a simple assembly with a reliable sealing always exists.

The object underlying the invention is, therefore, to improve a cable feed-through of the type specified at the outset in such a manner that it can easily be assembled, on the one hand, and ensures a reliable sealing, on the other hand.

SUMMARY OF THE INVENTION

This object is accomplished in accordance with the invention, in a cable feed-through of the type described at the outset, in that the elastic sealing element is assembled from two sealing element parts separated by a dividing surface and has a cable feed-through member which comprises at least one cable feed-through channel and inner sealing surfaces which can abut sealingly on at least one cable sheath, and that at least one holding element is provided, with which the two sealing element parts can be acted upon in such a manner that the inner sealing surfaces abut sealingly on the cable sheath and the sealing elements abut sealingly on one another with their contact surfaces respectively bordering on the dividing surface.

The advantage of the solution according to the invention is to be seen in the fact that it is possible, as a result of the complete separation of the sealing element into two sealing element parts along the dividing plane, to also place a cable in the cable feed-through channel likewise divided by the dividing plane as a cable which is ready made and accommodate the cable in a sealingly closed manner in the cable feed-through channel as a result of abutment of the sealing element parts on one another and action of a force thereon by the holding parts.

With respect to the design of the holding elements themselves, no further details have been given in conjunction with the preceding explanations concerning the solution according to the invention.

It is particularly favorable, for example, when the holding element is likewise designed to consist of two holding element parts so that the holding element itself can also be assembled and, therefore, does not cause problems during the assembly of the cable feed-through on a ready made cable.

In this respect, it is particularly favorable when a dividing surface separating the holding element parts coincides with the dividing surface of the sealing element parts.

In order to connect the two holding element parts to one another, the most varied of possibilities are conceivable.

For example, it would be conceivable to connect the holding element parts to one another by way of material locking.

A particularly favorable connection which can also be, in particular, released provides for the holding element parts to be connected to one another by way of force locking.

With respect to the assembly, it has proven to be particularly expedient when the holding element parts can be connected to one another by way of form locking.

A particularly advantageous embodiment of such form locking provides for the holding element parts to be connectable to one another by means of a lock-in connection.

In order to build up the holding elements in a particularly simple and inexpensive manner, it has proven to be expedient when the holding element parts of a holding element are designed to be mirror symmetric to a central axis of the holding element which is, in particular, also a central axis of the cable feed-through channel.

In this case, it is possible to construct the holding elements from two identical holding element parts which can be assembled to form the holding element.

In this respect, the central axis is expediently placed such that it is located in the dividing surface.

Another favorable design of the holding element parts provides for the holding elements parts to be designed to be mirror symmetric to a transverse axis, wherein the transverse axis is preferably designed to be at right angles to the central axis of the holding element.

In this respect, the transverse axis is expediently located in the dividing surface.

With respect to the connection of the holding element parts and the sealing element parts, no further details have so far been given.

In principle, these parts can be separate parts which are put together during the assembly of the cable feed-through.

It has, however, proven to be particularly advantageous when at least one holding element part is connected to a sealing element part to form a cable feed-through part.

Such a solution has the advantage that the holding element parts and the sealing element parts need not be assembled as individual parts but rather that two cable feed-through parts can be assembled as two units.

With respect to the connection of the at least one holding element part to the sealing element part, the most varied of solutions are conceivable. For example, it would be conceivable to connect the two in a form locking manner.

A particularly favorable solution provides for the at least one holding element part to be connected to the sealing element part in a material locking manner.

A particularly favorable realization for such a material locking connection provides for the sealing element part to be injection molded or cast onto the at least one holding element part.

In principle, the holding element could be designed such that it acts as a whole on the sealing element.

In this respect, one expedient solution provides for the holding element to have two holding element members which act on the sealing element.

One solution which is particularly favorable from a constructional point of view provides, however, for the holding element to act at least on one section of the feed-through member.

In conjunction with the preceding explanations, at least one holding element has always been mentioned which acts on the sealing element parts.

One particularly favorable solution provides for the sealing element parts to be acted upon by two holding elements.

In this respect, it is particularly favorable when one holding element acts on each of two sections of the feed-through member arranged at a distance from one another.

In order to be able to accommodate the cable feed-through according to the invention in a receiving means in a suitable manner, it is preferably provided for the at least one holding element to form supporting surfaces for a receiving means for the cable feed-through.

With such supporting surfaces provided on the at least one holding element it is, therefore, possible to fix the cable feed-through altogether on a housing or in a receiving means.

In this respect, the supporting surfaces can be arranged at any optional position on the holding element. It has proven to be particularly expedient when the supporting surfaces are arranged on a shell contour of the at least one holding element.

A shell contour is to be understood as the contour of the holding element which, in relation to the central axis, forms a shell, i.e., a contour surrounding the central axis like a shell.

With respect to the sealing of the cable feed-through outwards, no further details have so far been given.

In principle, it would be conceivable to provide the cable feed-through on the outside with a separate sealing element.

It has, however, proven to be particularly advantageous when the elastic sealing element is provided with an outer sealing surface for the cable feed-through.

The elastic sealing element therefore provides not only for the sealing in relation to the cable but is, in addition, in a position to made an outer sealing surface of the cable feed-through available in order to be able to install this in a sealingly closed manner.

The outer sealing surface is expediently constructed such that it extends around the elastic sealing element in a closed manner, wherein the outer sealing surface extends, in particular, in a closed manner around a central axis of the cable feed-through which is, in particular, also a central axis of the cable feed-through channel as well as of the sealing element and of the at least one holding part.

In order to arrange the outer sealing surface on the sealing element in a suitable manner, it is preferably provided for the outer sealing surface to be arranged on a sealing surface carrier integrally formed on the feed-through member.

In this respect, the sealing surface carrier is expediently designed such that it extends in a radial direction in relation to the cable feed-through channel in a manner located outwardly in relation to the feed-through member and, therefore, the possibility is created in a simple manner of arranging an outer sealing surface at a suitable position on the cable feed-through.

A particularly favorable solution provides for the sealing surface carrier to project beyond the at least one holding part in a radial direction in relation to the cable feed-through channel with an outer section bearing the outer sealing surface so that a favorable constellation is present which allows the outer sealing surface to be acted upon with the necessary sealing pressure and, therefore, to deform.

In order to adapt the contours of the at least one holding element and the outer sealing surface to one another, it is expediently provided for the at least one holding element to have an outer contour which is adapted to that of the outer sealing surface of the sealing element.

It is particularly expedient when providing supporting surfaces on the holding elements when the outer sealing surface of the sealing element projects beyond supporting surfaces of the at least one holding element in the state of the cable feed-through not acted upon with a force.

As a result, it is possible in a particularly simple manner, on the one hand, to fix the cable feed-through on the supporting surfaces, in addition, but, on the other hand, to also bring about an adequately good sealing in the area of the outer sealing surface.

A construction which is particularly advantageous on account of its symmetry provides for the sealing surface carrier to be arranged between two supporting surfaces so that a support of the holding element or the holding elements can be brought about on both sides of the sealing surface carrier.

As a result, such an arrangement of the holding elements also allows a suitable, additional support for the cable feed-through on both sides of the outer sealing surface borne by the sealing surface carrier.

With respect to the arrangement of the inner sealing surfaces, no further details have so far been given. One particularly favorable solution provides, for example, for the sealing element to comprise sealing rings bearing inner sealing surfaces which can abut on the cable sheath.

In order to bring about a good sealing in the area of the cable, it is particularly expedient when the sealing element comprises several sealing rings arranged at a distance from one another.

In this respect, the sealing rings are preferably arranged at a distance from one another and so as to follow one another in the direction of the central axis and enclose the cable guided through the cable feed-through channel.

Another, advantageous solution of a cable feed-through according to the invention provides for the sealing element parts to have recesses and/or projections engaging in one another. As a result, a good sealing can be realized in a simple manner in the area of the sealing element parts when these are intended to be assembled to form the sealing element.

One solution, with which each of the sealing element parts has at least one recess and at least one projection, has proven to be particularly advantageous.

It is particularly advantageous for the constructional realization of the sealing element parts when these are designed such that a sealing element part and an identical sealing element part turned through 180° about a transverse axis can be assembled, wherein the projection of one sealing element part engages in the respective recess of the other sealing element part.

In order to obtain a good sealing between the sealing element parts assembled to form the sealing element, in particular, in the area of the dividing surface, it is preferably provided for the sealing element parts to be designed such that their assembly to form the sealing element leads to a deformation of the elastic material forming the sealing element parts and so action by a force, which leads to an areal pressure between the sealing element parts improving the sealing, results in the area of the dividing surface.

With respect to as optimum and inexpensive a construction as possible of the cable feed-through according to the invention, it has proven to be particularly advantageous when each holding element is assembled from identical holding element parts.

In the case where two holding elements are provided, it is has proven to be advantageous when both holding elements of the cable feed-through are assembled from identical holding element parts so that four identical holding element parts can be used in order to assemble two holding elements.

Furthermore, it is likewise advantageously provided for the sealing element parts to be of an identical design.

One particularly expedient solution provides for the cable feed-through parts to be of an identical design so that a cable feed-through according to the invention may be assembled from two cable feed-through parts which are of an identical design.

In addition, the object according to the invention is accomplished by a cable feed-through system which comprises a frame, in which at least one cable feed-through as defined in claim 1 is inserted, which abuts sealingly on the frame at least partially with its outer sealing surface.

Such a cable feed-through system is suitable in a particularly advantageous manner for sealing cables inserted into appliances or machines.

In this respect, it is particularly expedient when several cable feed-throughs are inserted into the frame.

The sealing is preferably brought about such that at least one of the cable feed-throughs abuts with its outer sealing surface partially on the frame and partially on outer sealing surfaces of other ones of the cable feed-throughs.

In the case of several cable feed-throughs inserted into such a cable feed-through system, the dividing surfaces of cable feed-throughs located next to one another are expediently aligned such that they extend transversely to one another.

A solution which is particularly favorable with respect to a reliable positioning of the cable feed-throughs in the frame provides for the at least one cable feed-through to be fixable in a secure position in the frame with a positioning projection engaging in a positioning opening. As a result, it is possible to insert cable feed-throughs into the frame in a defined manner although they are not yet secured reliably by the remaining cable feed-throughs surrounding them at the location allocated to them.

Additional features and advantages of the invention are the subject matter of the following description as well as the drawings illustrating several embodiments.

DETAILED DESCRIPTION OF THE INVENTION

Figure 1:
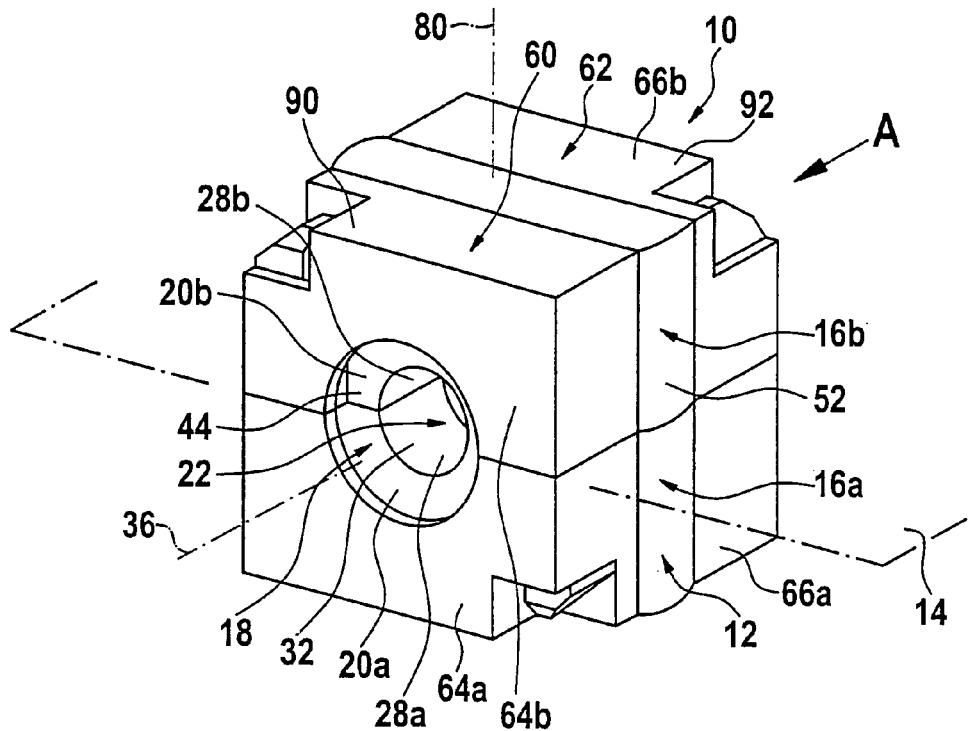
FIG. 1 shows a perspective view of a first embodiment of a cable feed-through according to the invention.
Figure 2:
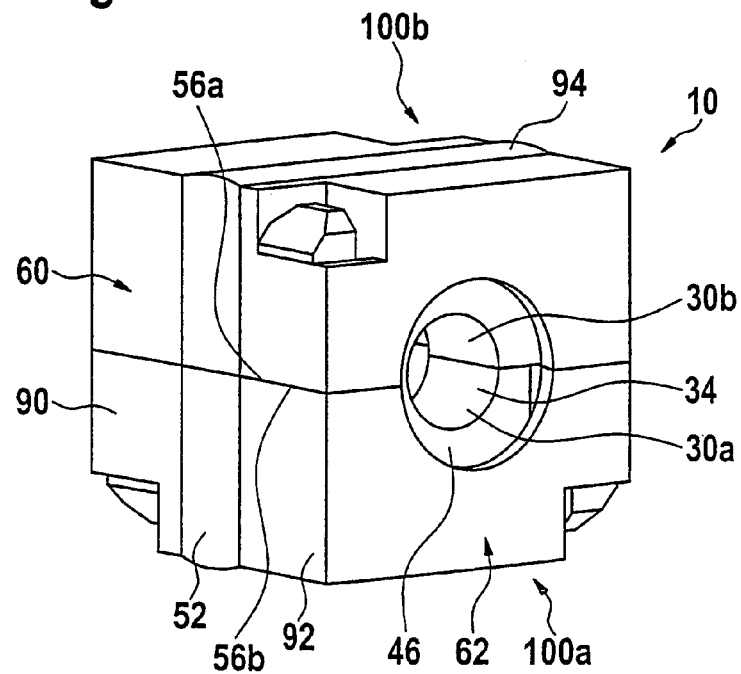
FIG. 2 shows a perspective view in the direction of arrow A in FIG. 1.
Figure 3:
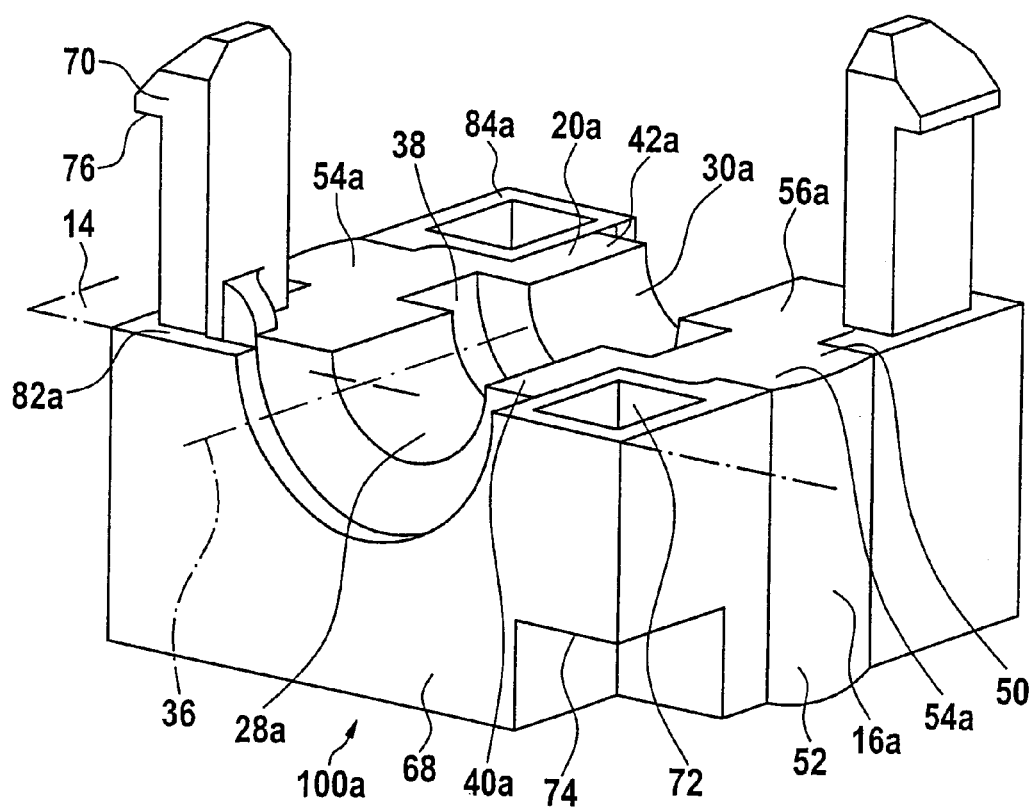
FIG. 3 shows an enlarged illustration of a cable feed-through part.

One embodiment of a cable feed-through according to the invention and designated as a whole as 10, illustrated in FIGS. 1 to 3, comprises a sealing element 12 which is formed from sealing element parts 16a, 16b separated along a dividing surface 14 forming a dividing plane and illustrated in FIG. 3, wherein the sealing element 12 comprises a feed-through member 18 which is formed, for its part, from feed-through member parts 20a, 20b.

Figure 4:
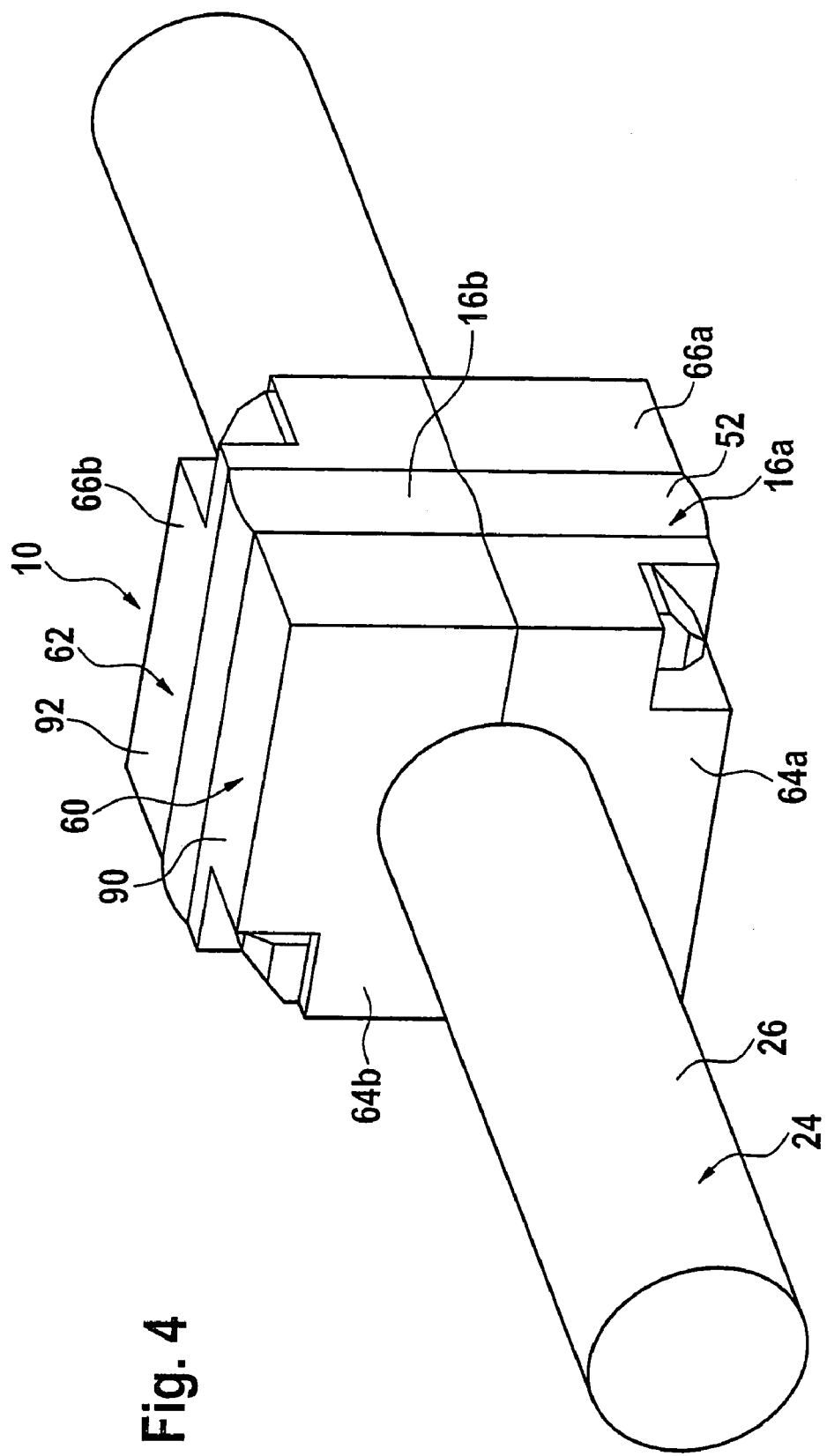
FIG. 4 shows a perspective illustration of a cable arranged in a cable feed-through according to the invention.

The feed-through member 18 forms a cable feed-through channel 22 for the feeding through of a cable 24, as illustrated in FIG. 4, wherein a cable sheath 26 is acted upon by the feed-through member 18 by way of inner sealing surface areas 28a, 28b and 30a, 30b which complement one another, in the case of the sealing element parts 16a, 16b assembled to form the sealing element 12, to form an inner sealing surface 32 and 34, respectively, extending around the cable sheath 26.

The inner sealing surface areas 28a, 28b and 30a, 30b are arranged at a distance from one another and so as to follow one another in the direction of a central axis 36 of the cable feed-through channel 22 and are separated by a recess 38 located between them and likewise extending around the cable sheath 26 so that each of the feed-through member parts 20a, b has sealing ring segments 40a and 42a, respectively, which bear the inner sealing surface areas 28a and 30a, respectively, are separated by the recess 38 and complement one another to form a respective sealing ring 44 and 46 which bears the circumferential inner sealing surface 32 and 34, respectively.

As a result of the recess 38, the material forming the sealing rings 44 and 46, respectively, has the possibility, when the cable sheath 26 is acted upon, of deflecting in the direction of the central axis 36 due to deformation.

In addition, each sealing element 12 comprises a sealing surface carrier 50 which projects beyond the feed-through member 18 radial to the central axis 36 and bears an outer sealing surface 52 which extends around the feed-through member 18, wherein the sealing surface carrier 50 is also formed from two sealing surface carrier parts 54a, 54b which are associated with the respective feed-through member parts 20a, b of the feed-through member 18.

In the case of each of the sealing element parts 16a, b, not only the feed-through member parts 20a, b with the sealing ring segments 40a, b as well as 42a, b but also the sealing surface carrier parts 54a, b extend as far as a respective contact surface 56a, b which extends over the entire sealing element part 16a, 16b and borders on the dividing plane 14 and with which the sealing element parts 16a, b can abut on one another in a sealingly closed manner.

In order to be able to abut the sealing element parts 16a, b sealingly on one another in the area of their contact surfaces 56a, b, two holding elements 60, 62 are associated with each sealing element 12 and these holding elements are, themselves, each formed from holding element parts 64a, 64b as well as 66a, 66b and likewise extend as far as the dividing plane 14.

Each of the holding element parts 64a, b as well as 66a, b comprises a holding element member 68 which abuts on the feed-through member parts 20a, 20b each time close to the sealing ring segments 40a, b and 42a, b, respectively, wherein each holding element member 68 is provided with a lock-in finger 70 on one side of the central axis 36 and with a lock-in finger receiving means 72 on the oppositely located side, wherein the lock-in finger receiving means 72 is designed, for example, as a channel, the lock-in nose 76 of the lock-in finger 70 being lockable to the end surfaces 74 of this channel located opposite the dividing plane 14.

In this respect, the holding element parts 64a, b and 66a, b, respectively, which are to be connected to one another each time to form a holding element 60 and 62, respectively, are designed to be mirror symmetric to the central axis 36 of the feed-through member 18 as a mirror axis.

Moreover, the holding elements 60, 62 are arranged so as to be mirror symmetric to a mirror axis 80 which is at right angles to the dividing plane 14 and extends centrally between the holding elements 60, 62 so that, altogether, both holding elements 60, 62 can be built up from identical parts and each of the holding elements 60, 62 is designed to consist of identical holding element parts 64a, b and 66a, b, respectively, so that, altogether, two holding elements 60, 62 consisting of four identical holding element parts 64 or 66 can be formed.

The holding element parts 64a, b and 66a, b, respectively, are also shaped such that they extend as far as the dividing plane 14 and border on the dividing plane 14 with their holding element surfaces 82a, 82b and 84a, 84b, respectively, bordering on the dividing plane 14 and, therefore, they can be supported on one another each time.

Each of the holding elements 60, 62 is, furthermore, provided with supporting surfaces 90 and 92, respectively, which are arranged on its outer side, extend around the respective area of the sealing element 12 and, therefore, around the central axis 36 and beyond which the sealing surface carrier 50 of the sealing element 12 projects with an outer section 94 bearing the outer sealing surface 52.

The cable feed-through 10 according to the invention is preferably assembled from two cable feed-through parts 100a, b which are of an identical design, wherein one of the cable feed-through parts 100 is built up as illustrated in FIG. 3 and comprises a sealing element part 16a as well as two holding element parts 64a and 66a, wherein the sealing element part 16 is injection molded onto the holding element parts 64a, 66a so that the holding element parts 64a and 66a form with the sealing element part 16a a unit which is connected to one another securely and in a form locking manner.

After the cable 24, which can already be ready made, i.e., provided with end-side connections, has been placed in the one cable feed-through part 100a in the part of the cable feed-through channel 22 extending in the feed-through member part 20a, the other cable feed-through part 100b may be placed on top from the side of the dividing plane 14 located opposite the cable feed-through part 100a and locked to it, wherein four lock-in fingers 70 engage altogether in corresponding lock-in finger receiving means 72 and engage with their lock-in noses 76, during locking, behind corresponding end surfaces 74 of the lock-in finger receiving means 72.

In this respect, the sealing element parts 16a, b abut on one another with their contact surfaces 56a, b in a manner acted upon by a force and are, therefore, connected sealingly to one another.

In addition, the inner sealing surface areas 28a, b and 30a, b, respectively, likewise abut sealingly on the cable sheath 26 and are pressed against it so that, altogether, the cable 22 with the cable sheath 26 is also held in the cable feed-through channel 22 in a sealingly closed manner and is also fixed in position against pulling in a frictional manner.

In the first embodiment illustrated, an outer contour of the holding elements and, therefore, the supporting surfaces 90, 92 are shell surfaces of a cylinder rectangular or square in cross section which correspond to the outer contour of the holding elements 60, 62 and the outer sealing surface 52 is adapted thereto, i.e., it is likewise approximately a shell surface of a cylinder rectangular or square in cross section, formed by the outer contour of the sealing surface carrier 50.

It is, however, also conceivable to design the supporting surfaces 90, 92 as shell surfaces of a cylinder which is oval or round, in particular, circular in cross section and the outer sealing surface 52 likewise so that the holding elements 60, 62 and the sealing surface carrier 50 also have a corresponding, oval or round outer contour.

Figure 5:
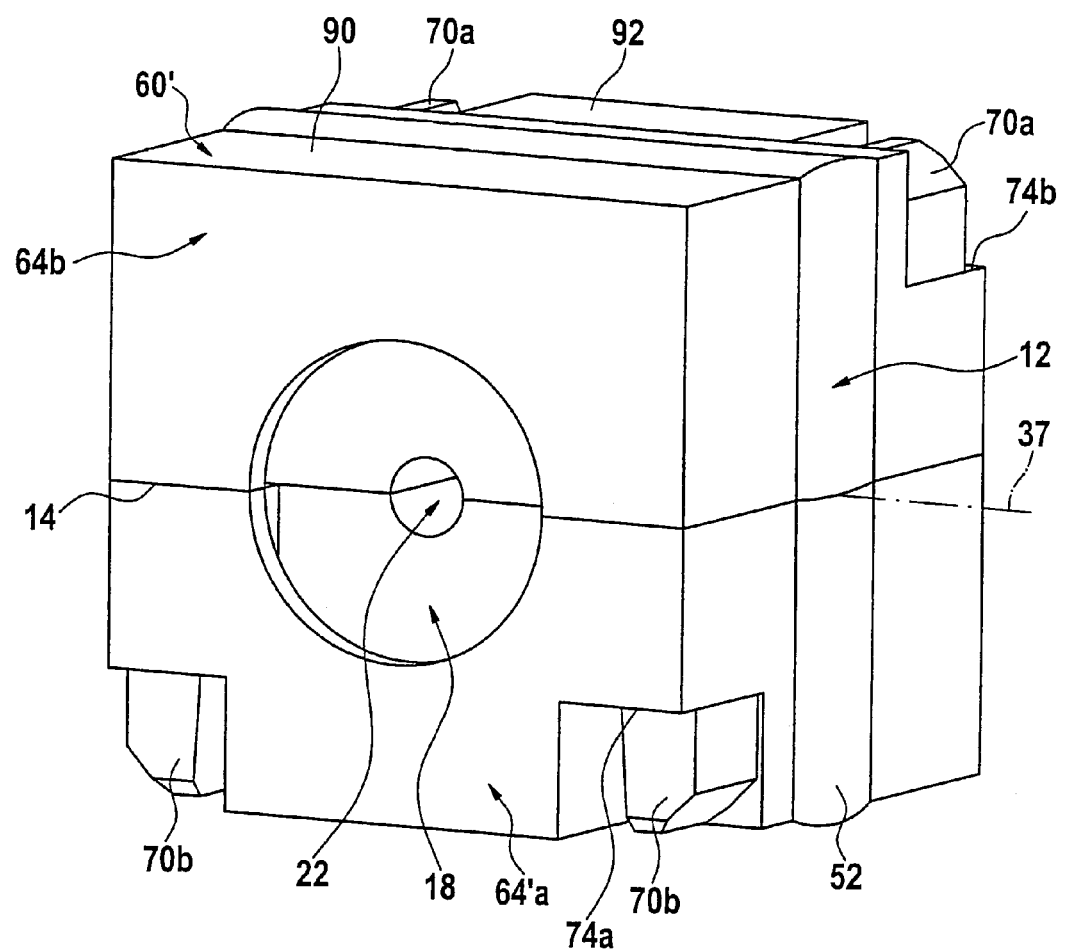
FIG. 5 shows a perspective view similar to FIG. 2 of a second embodiment of a cable feed-through according to the invention.
Figure 6:
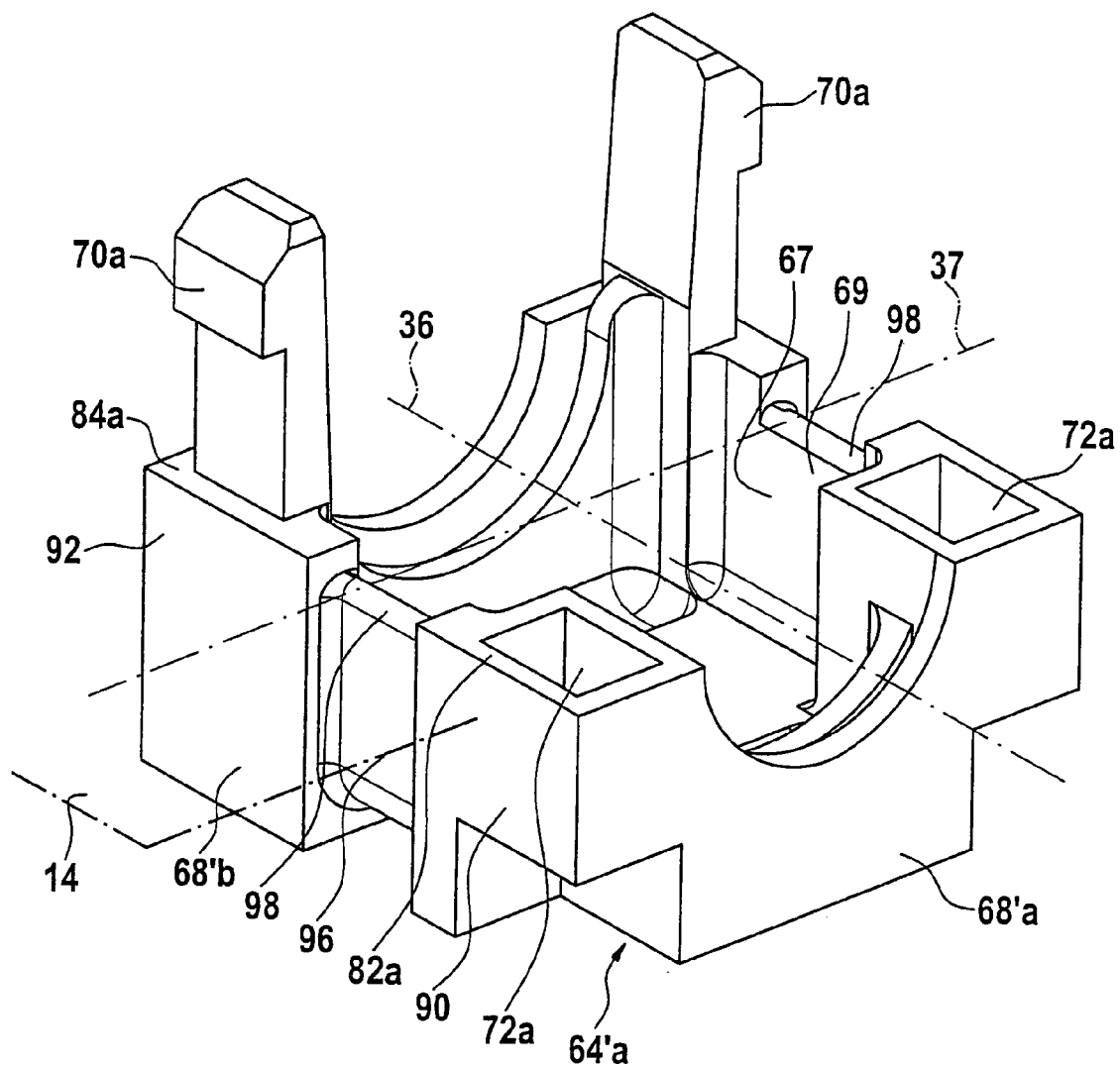
FIG. 6 shows a perspective illustration of a holding element part of the second embodiment of the cable feed-through according to the invention without the sealing element part held by the holding element part.
Figure 7:
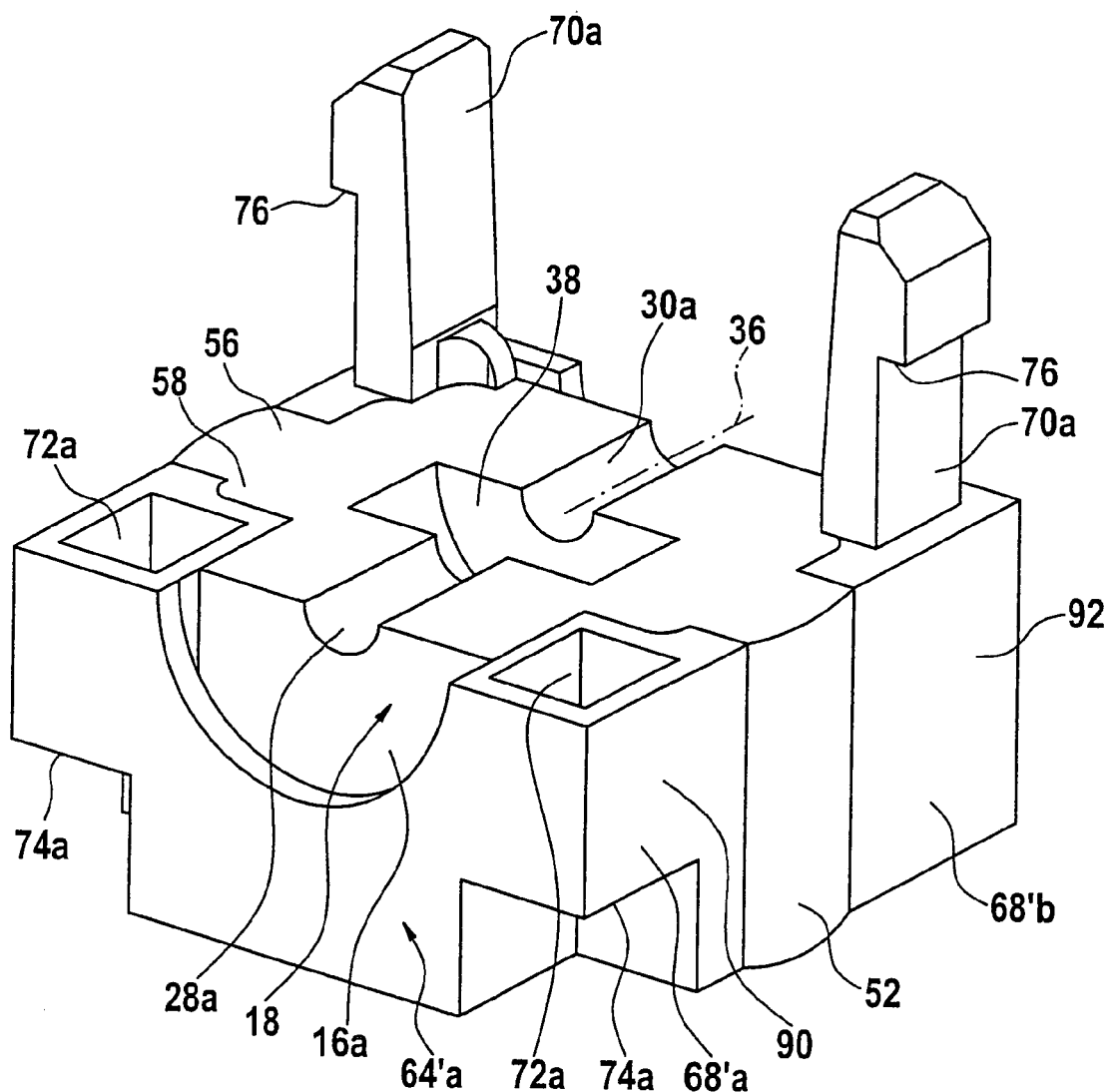
FIG. 7 shows a perspective illustration similar to FIG. 3 of the holding element part of the second embodiment together with the sealing element part.
Figure 8:
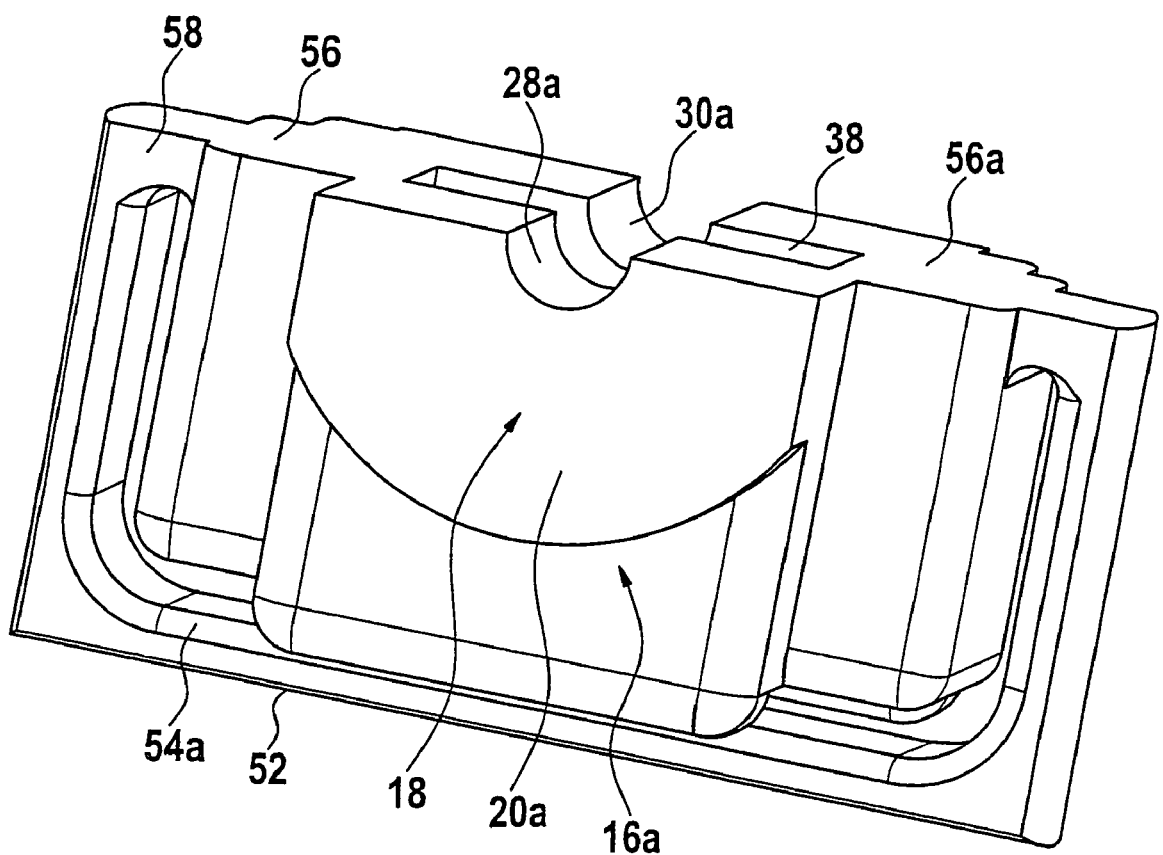
FIG. 8 shows a perspective illustration of the sealing element part according to FIG. 7 without the corresponding holding element part.

In a second embodiment of a cable feed-through according to the invention, illustrated in FIGS. 5 to 8, the feed-through member 18, as is apparent in FIGS. 7 and 8, is designed, in the same way as in the first embodiment, from two feed-through member parts 20a, b, as in the first embodiment, and, as illustrated, for example, in FIG. 7, forms the inner sealing surface areas 28 and 30 in the same way as in the first embodiment.

In contrast to the first embodiment, only one holding element 60' is, however, provided and this is assembled from two holding element parts 64'a and 64'b, wherein each of the holding element parts 64'a, b has, however, as illustrated in FIG. 7, two holding element members 68'a and 68'b which are connected to one another and are arranged so as to follow one another in the direction of the central axis 36 and, as illustrated in FIG. 6, are connected to one another by a connecting web 69, wherein the connecting web 69 extends approximately in a U shape so that the holding element part 64'a, b forms altogether a receiving means 67 for the respective sealing element part 16a, b which is of a trough-like design.

Furthermore, the holding element member 68'a of the second embodiment is provided with two lock-in finger receiving means 72a which are arranged on oppositely located sides of the central axis 36 whereas the holding element member 68'b is provided with two lock-in fingers 70a which are designed in accordance with the first embodiment.

As a result, the two holding element parts 64'a and 64'b are designed to be mirror symmetric to a transverse axis 37 which extends at right angles to the central axis 36 and is likewise located in the dividing plane 14 which separates the two holding element parts 64'a, 64'b from one another.

In order to connect the holding element parts 64'a and 64'b, the lock-in fingers 70a of the holding element part 64'a pass through the dividing plane 14 and dip into lock-in finger receiving means 72b of the holding element part 64'b while lock-in fingers 70b of the holding element part 64'b pass through the dividing plane 14 and engage in the lock-in finger receiving means 72a of the holding element part 64'a, as illustrated in FIG. 5.

The lock-in fingers 70a, 70b lock in the same way with the lock-in finger receiving means 72a, 72b by engaging behind the respective end surfaces 74b, 74a, as described in conjunction with the first embodiment.

The connecting web 69 is designed such that it extends in a manner set back in relation to the supporting surfaces 90, 92, formed by the holding element members 68'a, 68'b of both holding element parts 64'a, b, so that a U-shaped recess 96 is formed between the holding element members 68'a and 68'b.

Furthermore, the connecting web 69 is set back in relation to the holding element surfaces 82a and 84a with its end edges 98 such that the respective sealing surface carrier part 54 bearing the outer sealing surface 52 extends beyond the end edges 98 proceeding from the feed-through member part 20a, b, as illustrated in FIG. 8, and this carrier part is connected to the respective feed-through member part 20a, b merely via a web 58 engaging over the end edges 98 and, as for the rest, extends in the recess 96 of the respective holding element part 64'a, 64'b and is guided and supported by it.

The web 58 forms part of the contact surface 56 of the respective sealing element part 16a, b.

The respective feed-through member part 20a, 20b fills the respective receiving means 67 for the feed-through member part 20a, b in the respective holding element part 64'a, b and is supported, as a result, in the respective holding element part 64'a, b in such a manner that the inner sealing surface areas 28a, 28b as well as 30a, 30b can abut on the respective cable sheath 26 with adequate areal pressure.

With respect to its additional features and its additional functions, the second embodiment of the cable feed-through according to the invention is designed in the same way as the first embodiment and has the same advantages as this and so reference can be made in full to the comments concerning the first embodiment.

The sealing element 12 with the sealing element parts 16a, 16b is formed, in particular, in both the first and the second embodiments from a soft elastic material, preferably a soft rubber material which ensures a good sealing with the cable sheath 26 via the inner sealing surface areas 28a, b, 30a, b but also, in addition, a good sealing via the contact surfaces 56a, 56b of the sealing element parts 16a, b and, finally, also a good sealing via the outer sealing surfaces 52 which are formed by the sealing element 12.

On the other hand, the holding elements 60, 62, in particular, with the holding element parts 64a, 64b as well as 64'a, 64'b as well as 66a, b are formed from a stable material, preferably a dimensionally stable plastic, for example, a tough-resilient plastic which is in a position to ensure an adequate elasticity in the area of the lock-in fingers 70.

Figure 9:
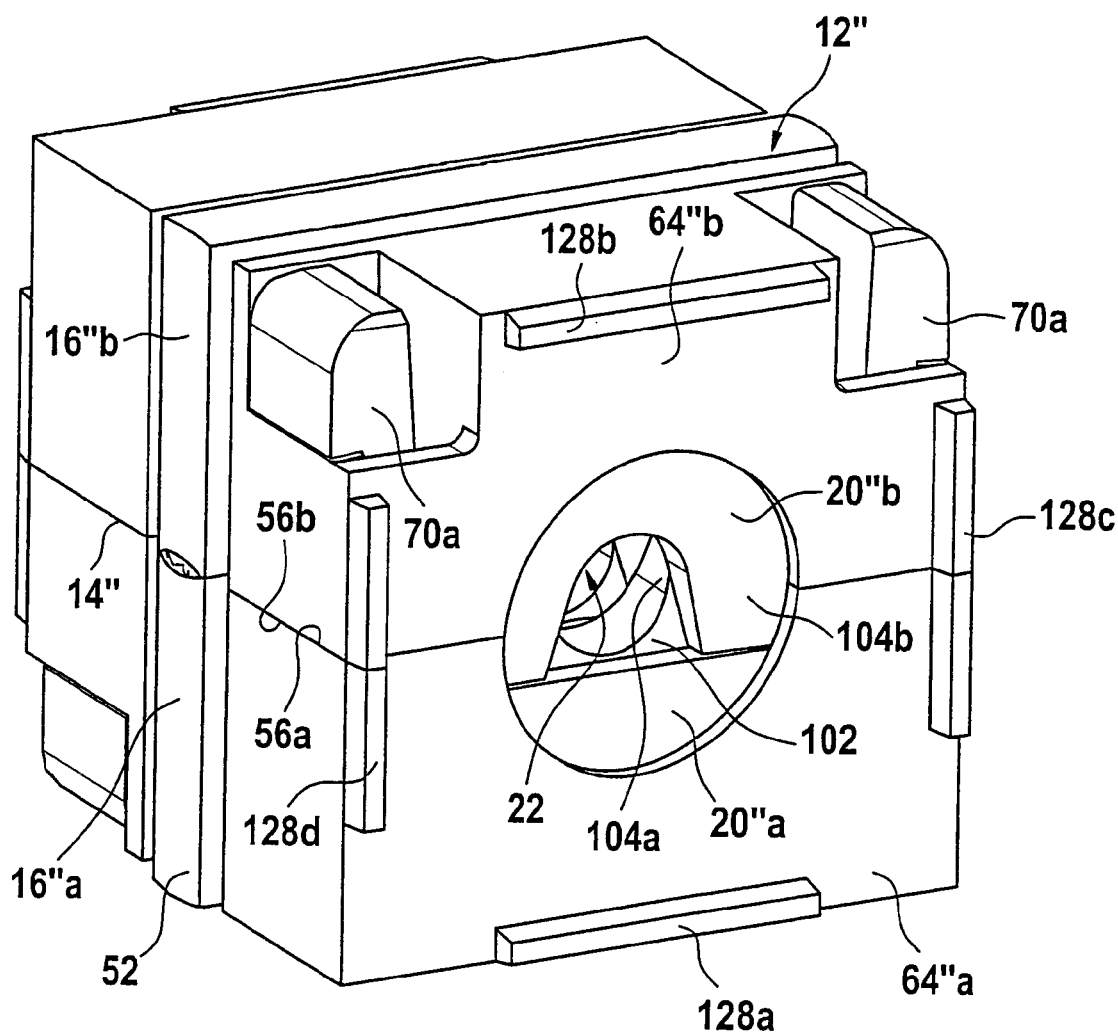
FIG. 9 shows a perspective illustration similar to FIG. 2 of a third embodiment of a cable feed-through according to the invention.
Figure 10:
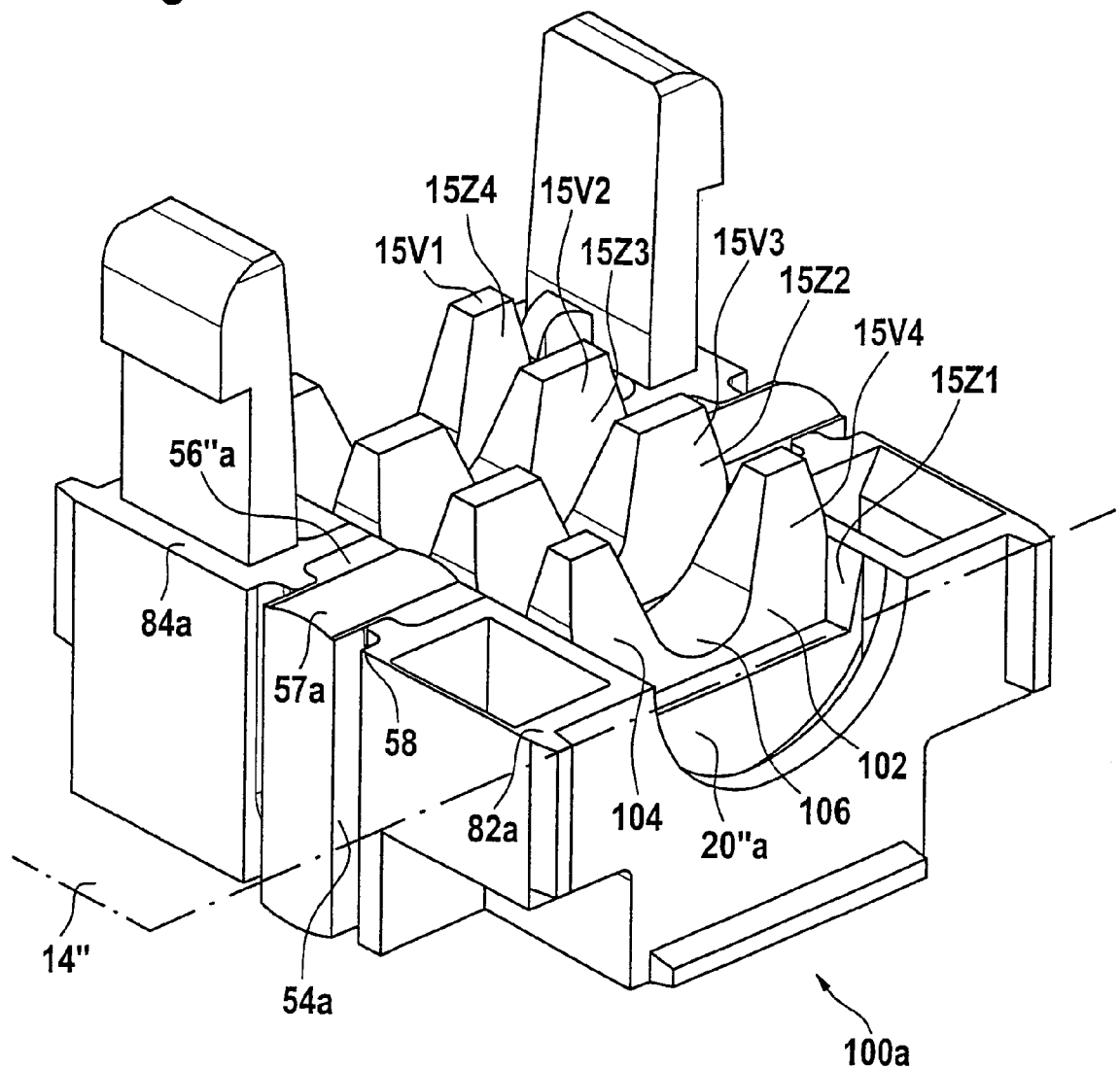
FIG. 10 shows a perspective illustration of the cable feed-through part of a third embodiment of a cable feed-through according to the invention.
Figure 11:
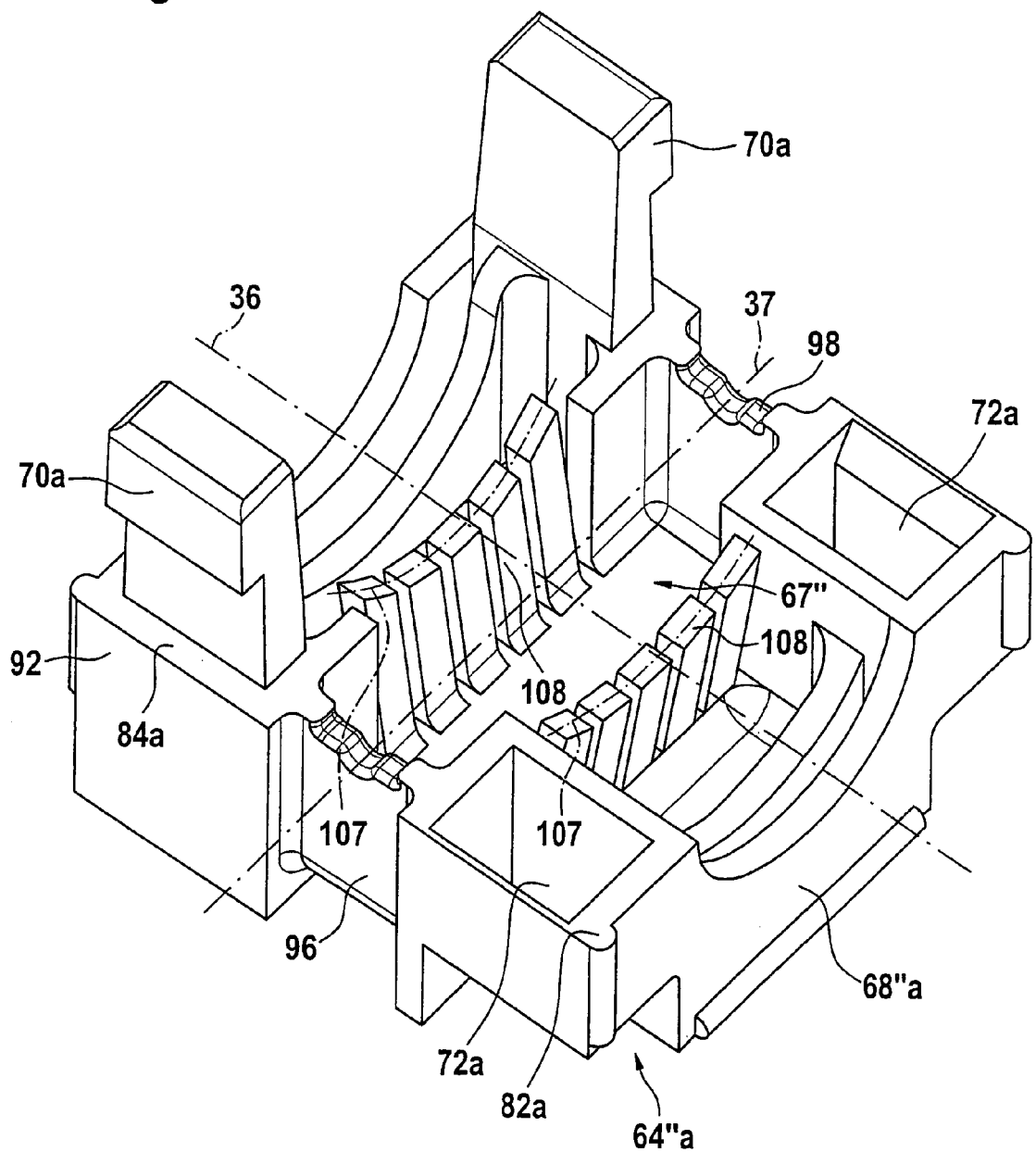
FIG. 11 shows a perspective illustration of a holding element part of the third embodiment without the sealing element part.
Figure 12:
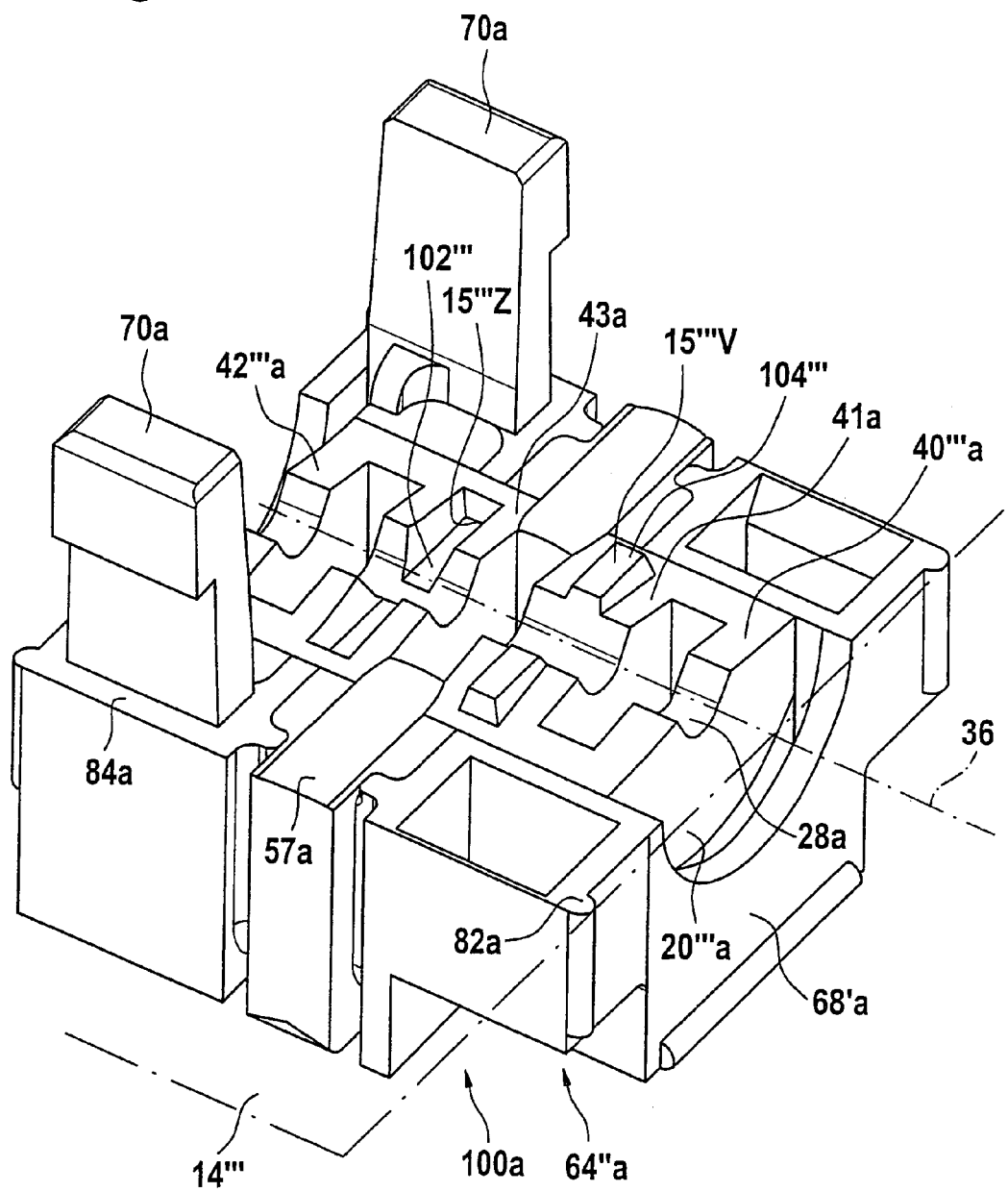
FIG. 12 shows a perspective illustration similar to FIG. 10 of a cable feed-through part of a fourth embodiment of a cable feed-through according to the invention.

In a third embodiment of a cable feed-through according to the invention, illustrated in FIGS. 9 to 11, those elements which are identical to those of the preceding embodiments are given the same reference numerals and so reference is made in full to the comments hereon.

In contrast to the first and second embodiments, the dividing surface 14" of the third embodiment is not a continuous plane but rather only flat in the area of the holding element surfaces 82a and 84a and already curved convexly in relation to the plane formed by the holding element surfaces 82a and 84a in the section 57a of the contact surfaces 56"a which leads to the web 58.

Furthermore, the dividing surface 14" is of a complex design in the area of the feed-through member parts 20"a and comprises, in contrast to the plane formed by the holding element surfaces 82a and 84a, recessed areas, for example, the areas 15Z1, 15Z2, 15Z3 and 15Z4 as well as areas projecting above the plane formed by the holding surfaces 82a and 84a, for example, the areas 15V1, 15V2, 15V3 and 15V4, wherein during the assembly of two feed-through member parts 20"a and 20"b the projecting area 15V1 of the one feed-through member part 20"a engages in the recessed area 15Z1 of the other feed-through member part 20"b, the projecting area 15V2 of the one feed-through member part 20"a engages in the recessed area 15Z2 of the other feed-through member part 20"b, the projecting area 15V3 engages in the recessed area 15Z3 of the other feed-through member part 20"b and the projecting area 15V4 of the one feed-through member part 20"a engages in the recessed area 15Z4 of the other feed-through member part 20"b and, as a result, a dove-tailed interconnection of the feed-through member parts 20"a and 20"b takes place during the assembly.

In this respect, the recessed areas 15Z preferably have smaller dimensions than the projecting areas 15V engaging in them and so a deformation of the elastic material forming the feed-through member parts 20"a and 20"b, in particular, a compression thereof must also take place, wherein a considerable alternating areal pressure results in the area of the surfaces of the recessed areas 15Z and the projecting areas 15V abutting on one another, whereby a sealed connection can be achieved.

In this third embodiment, the recessed areas 15Z of the dividing surface 14" are formed by recesses 102 integrally formed in the respective feed-through member part 20" and the projecting areas 15V of the dividing surface 14" by projections 104 of the feed-through member parts 20" rising on both sides of a cable section 106.

In addition, a displacement of the elastic material of the feed-through member parts 20"a, b also takes place when the feed-through member parts 20"a and 20"b are pressed together in the area of the sections 57a formed by the sealing surface member parts 54 and so the feed-through member parts 20"a, b abut on one another in the sections 57a in a manner acted upon by a force.

The holding element parts 64"a, b are, in principle, of exactly the same design as in the second embodiment, illustrated in FIG. 6. In contrast to the second embodiment, supporting fingers 108 are, however, preferably provided in the receiving means 67" and these fingers are arranged in rows 107 and improve the anchoring of the respective feed-through member part 20"a, b in the respective holding element part 64"a, as illustrated in FIG. 11.

In a fourth embodiment of a cable feed-through according to the invention, illustrated in the form of one of the two cable feed-through parts 100, in this case the cable feed-through part 100a, the dividing surface 14''' is likewise not a plane but rather merely of a flat design in the area of the holding element surfaces 82a and 84a in the same way as in the third embodiment while the section 57a is designed as a convex surface, as in the third embodiment. The respective feed-through member part 20''', in this case the feed-through member part 20'''a, has sealing ring segments 40 and 42 in the same way as in the first embodiment, in this case the sealing ring segments 40'''a and 42'''a which do, however, rise convexly in the direction of the central axis 36 starting from the holding element surfaces 82a and 84a so that the inner sealing surface area 28a extends eccentrically to the central axis 36 in the case of the individual feed-through member part 20'''a.

As a result, during the assembly of the feed-through member parts 20'''a, b an increased areal pressure of the surfaces abutting on one another results in the area of the sealing ring segments 40'''a and 40'''b or 42'''a and 42'''b abutting on one another and, therefore, an improved sealing in the area of the dividing surface 14''' separating the sealing rings 44''' and 46''' which is then located approximately in a plane extending at the level of the holding element surfaces 82a and 84 on account of the deformation of the elastic material.

In addition to the sealing ring segments 40''' and 42''', further sealing ring segments 41 and 43 are provided in the fourth embodiment, wherein each sealing ring segment 41 has projections 104''' whereas the other sealing ring segment 43 has recesses 102''' which are likewise arranged symmetrically to the transverse axis 37 so that the projections 104''' in the sealing ring segment 41a of the one feed-through member part 20'''a engage in the recesses 102''' of the sealing ring segment 43a of the other feed-through member part 20'''b when the two feed-through member parts 20'''a and 20'''b are assembled and, therefore, improve the sealing, in addition, wherein the recesses 102''' have smaller dimensions than the projections 104''' engaging in them so that an intensified areal pressure also results in the area of the interacting recesses 102''' and projections 104''' and this leads to a deformation of the elastic material of the feed-through member parts 20'''a and 20'''b in the area of the recesses 102''' and projections 104'''.

The recesses 102''' and the projections 104''' likewise form, on the one hand, recessed areas 15'''z and projecting areas 15'''v, respectively, of the dividing surface 14''' which therefore has a complex surface shape in the area of the recesses 102''' and projections 104'''.

Figure 13:
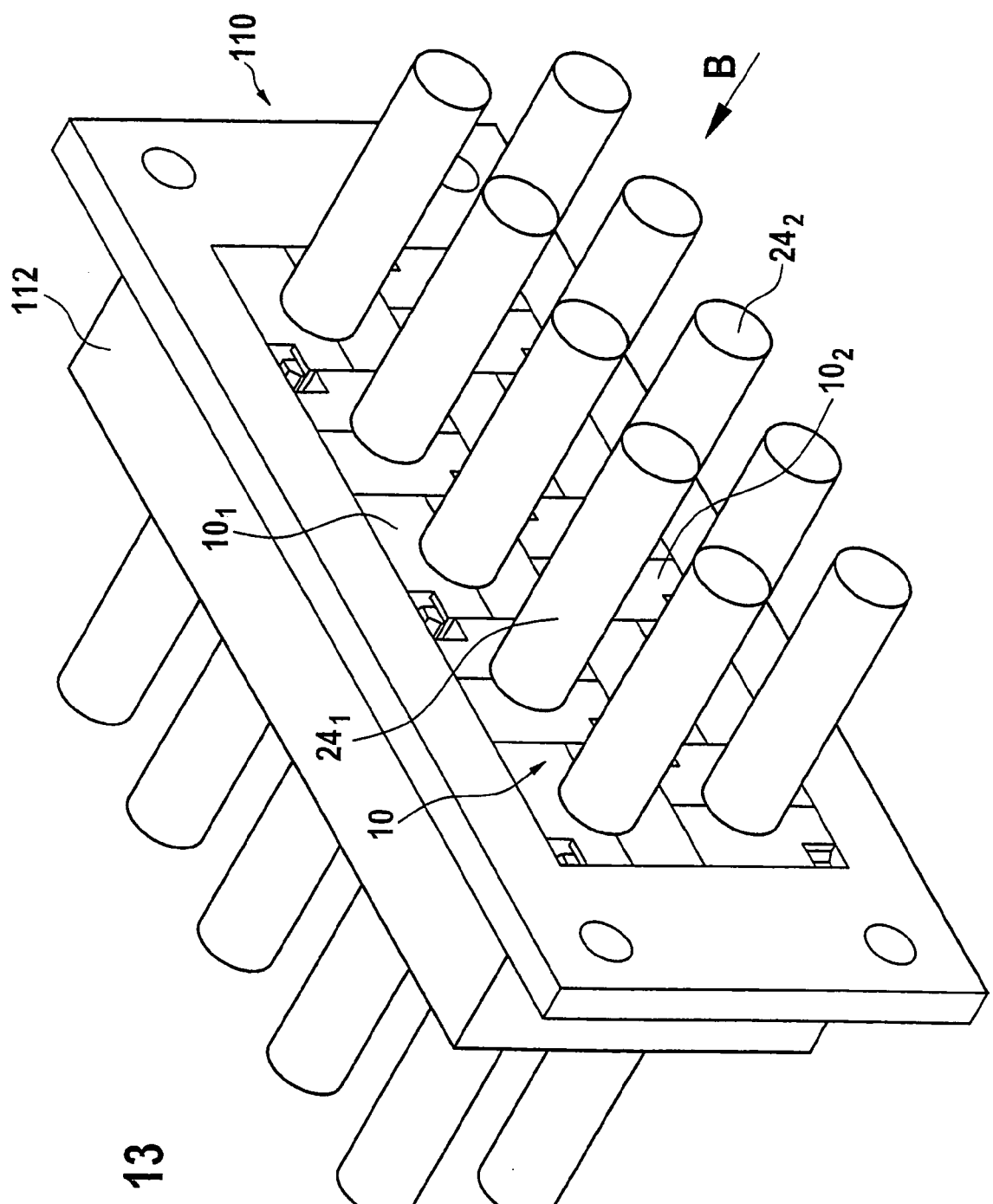
FIG. 13 shows a perspective illustration of a first embodiment of a cable feed-through system according to the invention with several cable feed-throughs according to FIGS. 1 to 4 or FIGS. 5 to 8.
Figure 14:
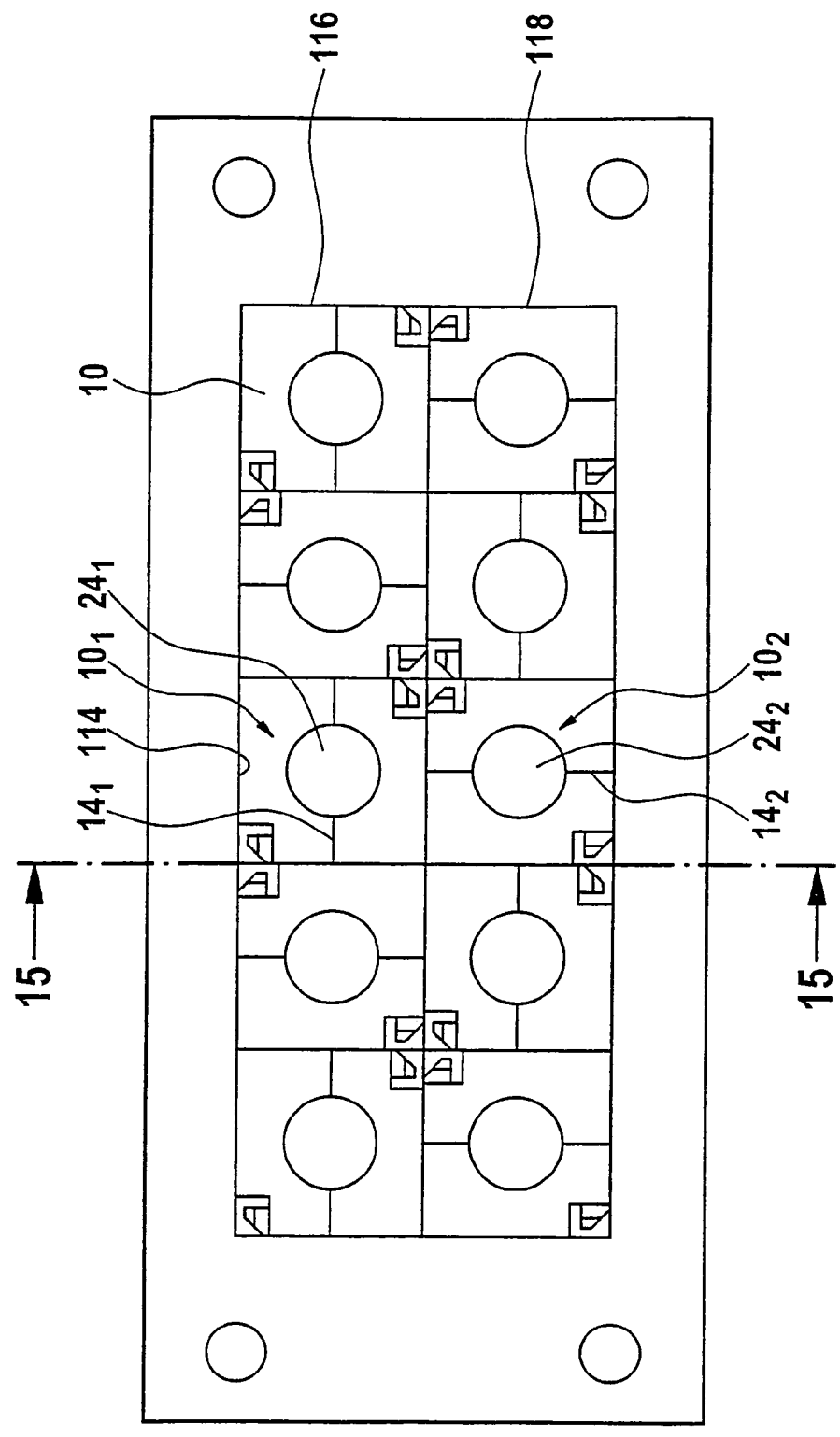
FIG. 14 shows a plan view in the direction of arrow B in FIG. 13.
Figure 15:
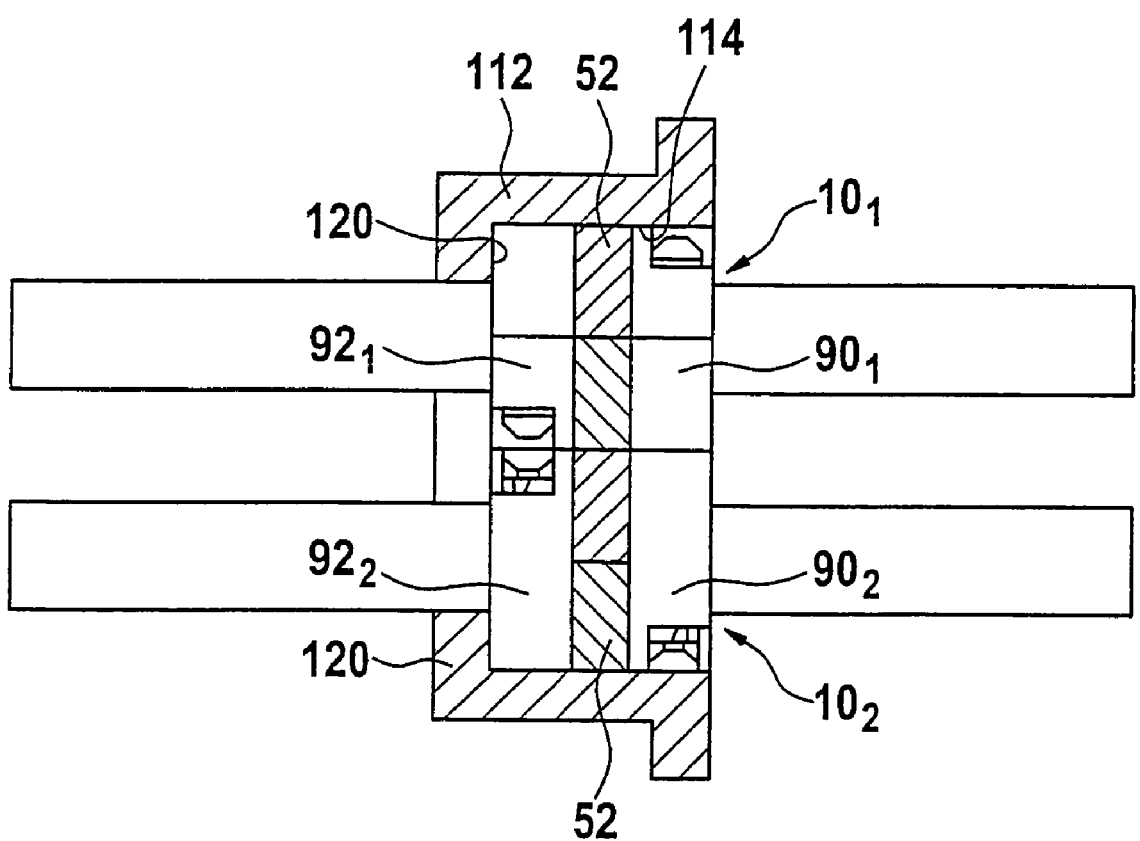
FIG. 15 shows a section along line 15-15 in FIG. 14.

The cable feed-throughs 10 according to the invention and illustrated in FIGS. 1 to 4 or 5 to 9 may, as illustrated in FIGS. 13 to 15, be combined with supporting surfaces 90, 92 and an outer sealing surface 52, which correspond to shell surfaces of cylinders which are rectangular or square in cross section, to form cable feed-through systems 110, with which several of the cable feed-throughs 10 according to the invention are arranged so as to be seated directly next to one another in a frame 112, wherein the individual cable feed-throughs 10, as illustrated in FIG. 10 and FIG. 11, abut with their outer sealing surfaces 52 either on an inner surface 114 of the frame 112 or on outer sealing surfaces 52 of adjacent cable feed-throughs 10 and, therefore, a sealed connection results each time circumferentially around each cable feed-through 10 according to the invention.

At the same time, the cable 24 guided through is held sealingly in the feed-through member 18 in each of the cable feed-throughs 10 and so, altogether, the respective cable 24 is sealed in relation to the frame 112.

Adjacent cable feed-throughs 10 are, in order to improve the sealing, preferably always arranged such that their dividing planes 14 are not aligned with one another but rather extend transversely, preferably at right angles to one another.

In addition, the cable feed-throughs 10 are located in the frame 112 preferably such that they form rows 116, 118 located next to one another, wherein each of the rows 116, 118 abuts, on the one hand, on the frame 112 and, on the other hand, on the adjoining row 118, 116.

Furthermore, the frame 112 is provided, in addition, with a recessed area 120, wherein each of the rows 116, 118 is supported against such a recessed area 120.

In the case of the sealed arrangement of the cable feed-throughs 10 according to the invention in the frame 112, the outer sections 94 are pressed in such a manner that the outer sealing surfaces 52 extend essentially flush with the supporting surfaces 90, 92 and, in addition, the cable feed-throughs 10 are supported on one another and on the frame 112 via their supporting surfaces 90 and 92 and, therefore, a stable and at least force locking fixing of the cable feed-throughs 10 in the frame 112 is brought about as a whole.

Alternatively, it is also possible to provide in a receiving member a plurality of oval or round receiving means for cable feed-throughs with supporting surfaces 90, 92 and an outer sealing surface 52 which correspond to shell surfaces of cylinders which are oval or round in cross section, wherein sealing is brought about in each receiving means by way of the respective outer sealing surface 52.

Figure 16:
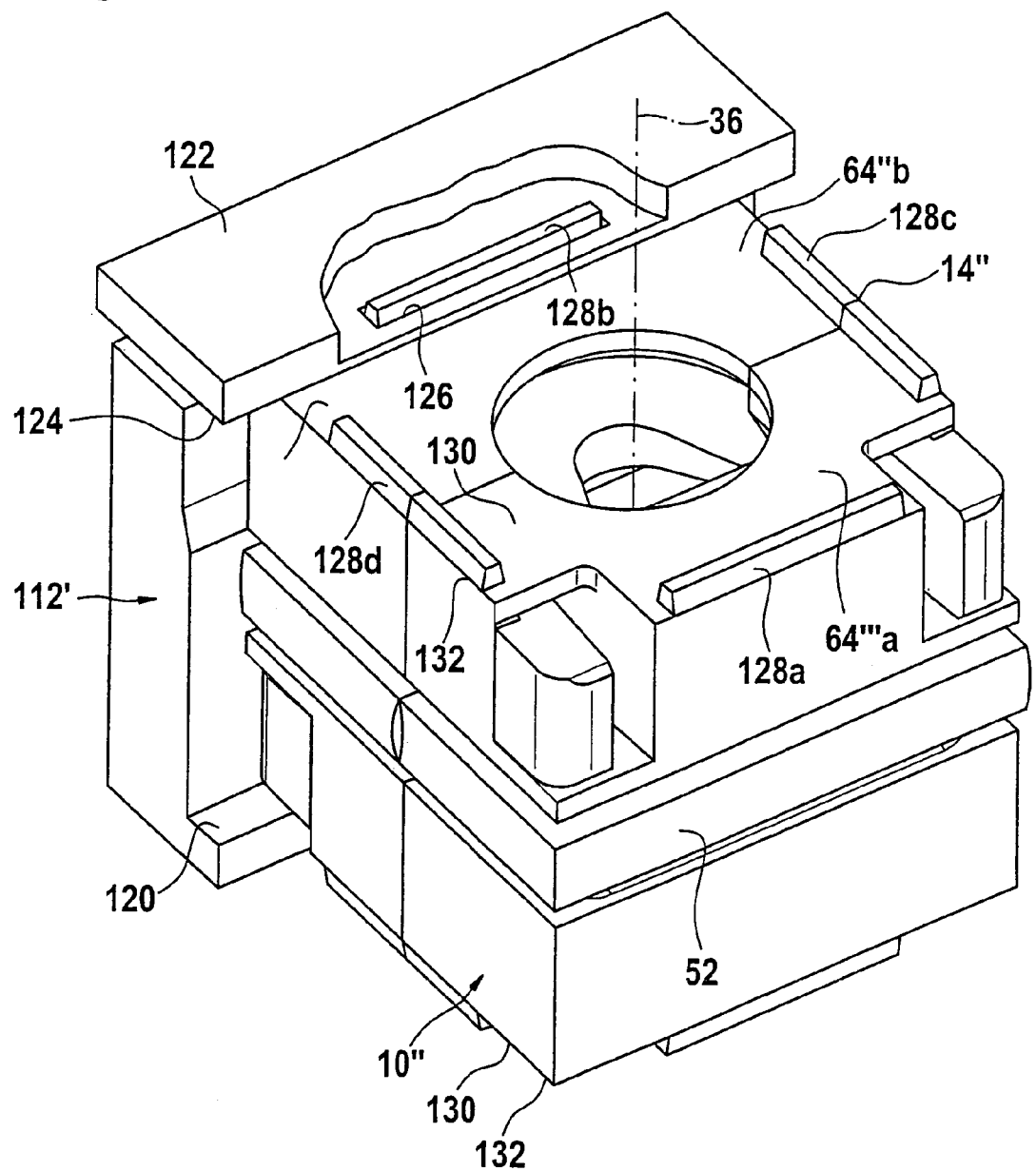
FIG. 16 shows a perspective illustration of a second embodiment of a cable feed-through system according to the invention with one of several cable feed-throughs according to FIGS. 9 to 11 or FIG. 12.

In a second embodiment of a cable feed-through system according to the invention, illustrated in FIG. 16, those elements which are identical to those of the first embodiment are given the same reference numerals and so reference can be made to them in full with respect to their description.

In contrast to the first embodiment of the cable feed-through system according to the invention, the frame 112' is designed such that it has a removable frame cover 122 which is placed on the frame 112 following insertion of the plurality of cable feed-throughs 10" according to the third embodiment or 10''' according to the fourth embodiment so that a further recessed area 124 results opposite the recessed area 120.

The frame cover 122 is provided, in addition, with positioning openings 126, in which one of the positioning projections 128 of the respective cable feed-through 10" can engage, wherein a non-displaceable positioning of the respective cable feed-through 10" in the frame 112' is possible as a result of the positioning opening 126.

The cable feed-throughs 10" or 10''' are preferably provided with positioning projections 128 on outer edges 132 of their two end sides 130 located opposite one another, wherein the positioning projections 128 are all arranged in the same position in relation to the central axis 36 and are preferably rotationally symmetric to the central axis 36 so that the cable feed-throughs 10" can be brought into engagement, with the one of their positioning projections 128a to 128d, with the one selected positioning opening 126 in the frame cover 122 as a result of rotation each time through 90° about the central axis 36 and can thus be positioned.

The positioning projections 128c and 128d are also separated by the dividing surface 14' but have, altogether, the same extension, position and dimensions as each of the positioning projections 128a and 128b (FIG. 16).

In the frame 112', at least one positioning opening 126 is provided in the frame cover 122 for each cable feed-through to be inserted and so, as a result, a secure, reliable and, in particular, non-displaceable fixing of the cable feed-throughs 10" in the respective frame 112' can be carried out.

In addition to the provision of the positioning openings 126 in the frame cover 122, positioning openings 126 are likewise provided in the part of the frame 112' having the recessed area 120.

Figure 17:
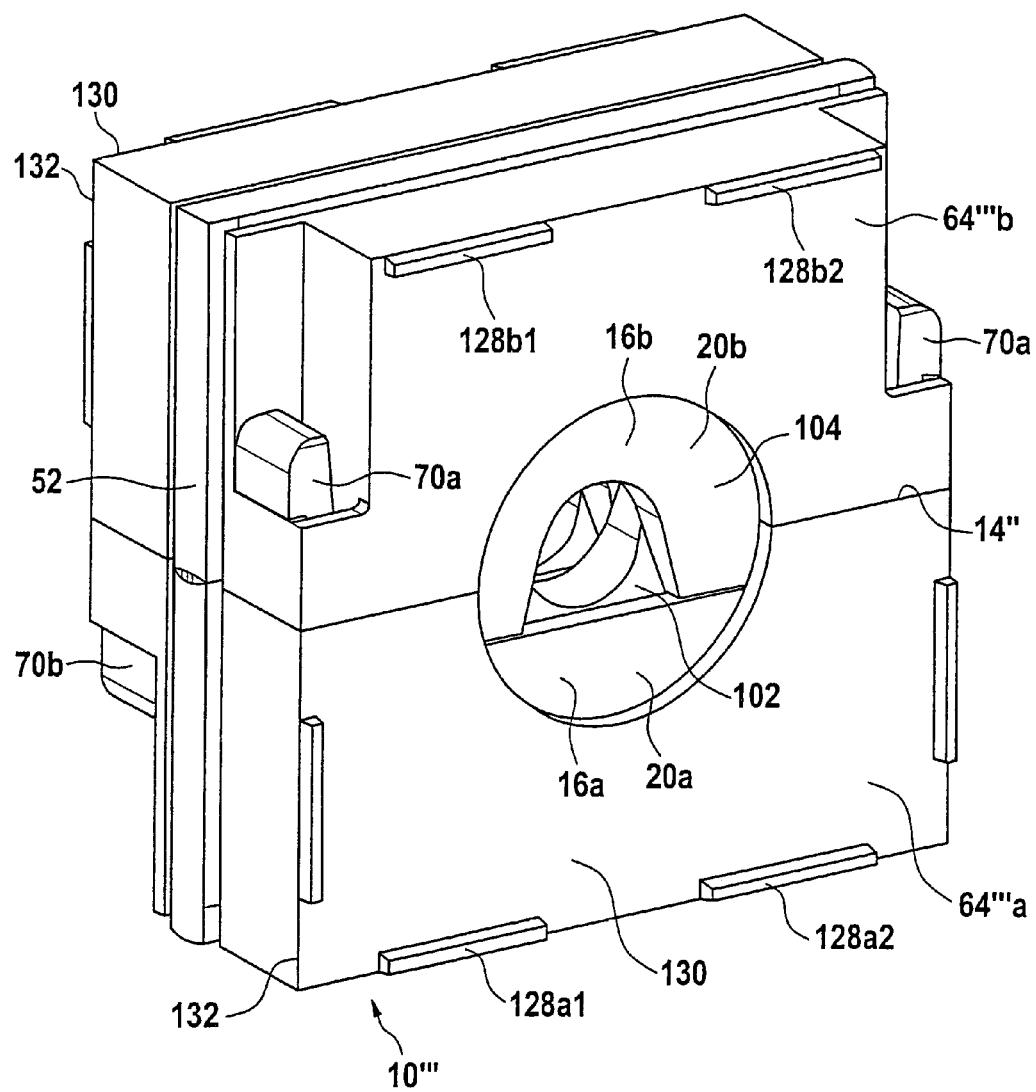
FIG. 17 shows a perspective illustration of a fifth embodiment of a cable feed-through according to the invention for large cables for the second embodiment of the cable feed-through system according to the invention.

The cable feed-throughs 10 need not always have the same standard size for a cable feed-through system according to the invention but rather it is conceivable to provide different standard sizes, wherein it is advantageous in the case of different standard sizes to dimension the successive standard sizes such that the next largest standard size has double the edge length. Such an additional standard size of a cable feed-through is illustrated in FIG. 17 as fifth embodiment, wherein two positioning projections 128, for example, the positioning projections 128a1 and 128a2 are provided at each outer edge and the distance between them is that between the positioning projections 128 of two cable feed-throughs 10" immediately adjacent to one another in the case of the standard size with half the edge length.

A cable feed-through 10''' therefore takes up four times the space, for example, of a cable feed-through 10" in the frame 112' and therefore replaces four cable feed-throughs 10".

Figure 18:
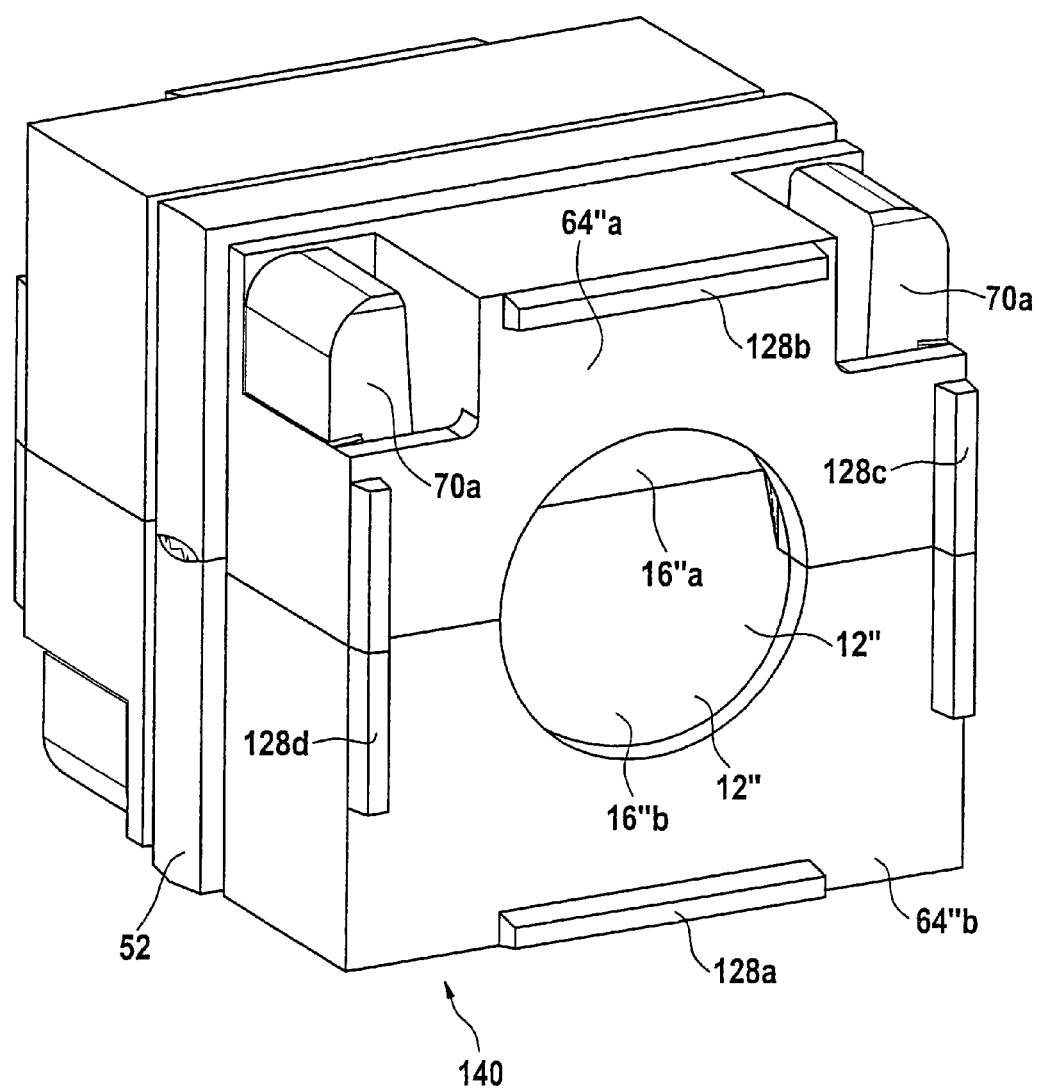
FIG. 18 shows a perspective illustration of a blind feed-through for a cable feed-through system according to the invention, in particular in accordance with the second embodiment

In order to be able to use the frame 112, for example, the frame 112' in one of the cable feed-through systems according to the invention even when the required number of cable feed-throughs 10" or 10''' is less than the number of cable feed-throughs 10" or 10''' possible in the frame 112', blind feed-throughs 140 illustrated in FIG. 18 can also be used in such a cable feed-through system and their holding element parts 64"a and 64"b are designed in the same way as, for example, in the third embodiment. Furthermore, these holding element parts 64"a and 64"b are likewise provided with sealing elements 12" which are designed, in principle, in the same way as in the third embodiment but have no cable section 106 and so, altogether, the assembly of the sealing element parts 16"a and 16"b to form a sealed connection leads to an interior space enclosed by the holding element parts 64"a and 64"b and, therefore, space not required for cable feed-throughs 10" in the frame 112' can be filled with such a blind feed-through 140.

Figure 19:
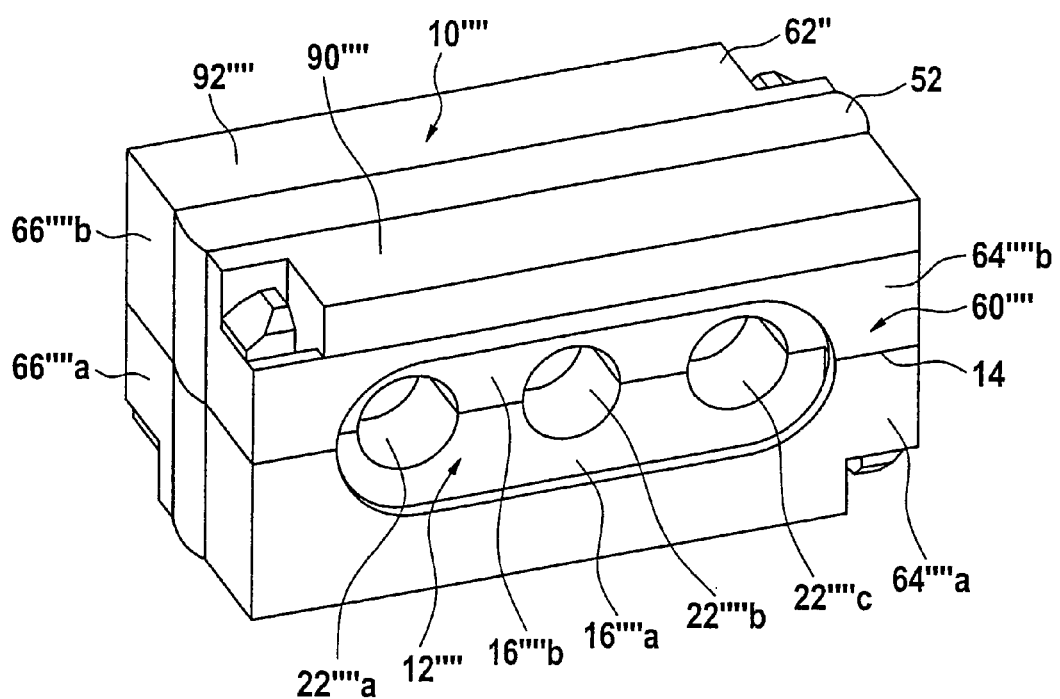
FIG. 19 shows a sixth embodiment of a cable feed-through according to the invention.

A sixth embodiment of a cable feed-through according to the invention, illustrated in FIG. 19, is, in principle, constructed in the same way as the first embodiment but the sealing element 12"" is designed such that it comprises several, for example, three cable feed-through channels 22""a, 22""b and 22""c which are arranged so as to lie next to one another.

The sealing element 12"" is still, however, assembled from two sealing element parts 16""a and 16""b, wherein the sealing element parts are likewise held together by holding elements 60"" and 62"" which are likewise divided by the dividing plane 14 into holding element parts 64""a and 64""b as well as 66""a and 66""b.

In addition, it is possible in the sixth embodiment to also design the cable feed-through channels with non-round cross sectional shapes and, therefore, to also feed through cables which are, for example, oval, rectangular or flat in cross section and to obtain a sealed connection with them.

As for the rest, the sixth embodiment of the cable feed-through according to the invention is constructed from elements which are identical to those of the first or second embodiments and so reference can be made in full to the first or second embodiments with respect to the description thereof.

The sixth embodiment of the cable feed-through 10"" according to the invention may likewise be used with several of the cable feed-throughs 10 and/or 10"" in the frame 112, wherein the outer dimensions in the area of the supporting surfaces 90"" and 92"" are preferably selected in such a manner that the second embodiment of the cable feed-through 10"" requires the same space as two cable feed-throughs 10 of the first embodiment and so a combination is also possible in the same way with the cable feed-throughs 10 of the first embodiment.

The invention claimed is:

1. Cable feed-through, comprising:
    an elastic sealing element having at least one cable feed-through channel, the elastic sealing element being provided with an outer sealing surface for the cable feed-through, the elastic sealing element being assembled from two sealing element parts separated by a dividing surface and having a feed-through member comprising the at least one cable feed-through channel, said feed-through member comprising inner sealing surfaces adapted to abut sealingly on at least one cable sheath,
    at least one holding element, said holding element having an outer contour corresponding to shell surfaces of a cylinder, said holding element acting on the two sealing element parts in such a manner that the inner sealing surfaces abut sealingly on the cable sheath and the sealing element parts abut sealingly on one another with their contact surfaces respectively bordering on the dividing surface,
    the outer sealing surface of the sealing element projecting beyond the outer contour of the at least one holding element in a state of the cable feed-through not acted on with a force.

2. Cable feed-through as defined in claim 1, wherein the holding element is assembled from two holding element parts.

3. Cable feed-through as defined in claim 2, wherein a dividing surface separating the holding element parts coincides with the dividing surface of the sealing element parts.

4. Cable feed-through as defined in claim 2, wherein the holding element parts are connectable to one another by way of form locking.

5. Cable feed-through as defined in claim 2, wherein the holding element parts of the holding element are designed to be mirror symmetric to a central axis of the holding element.

6. Cable feed-through as defined in claim 5, wherein the central axis is located in the dividing surface.

7. Cable feed-through as defined in claim 2, wherein the holding element parts are designed to be mirror symmetric to a transverse axis.

8. Cable feed-through as defined in claim 7, wherein the transverse axis is located in the dividing surface.

9. Cable feed-through as defined in claim 1, wherein at least one holding element part is connected to one of the sealing element parts to form a cable feed-through part.

10. Cable feed-through as defined in claim 9, wherein the at least one holding element part is connected to the sealing element part in a material locking manner.

11. Cable feed-through as defined in claim 9, wherein the cable feed-through parts are of an identical design.

12. Cable feed-through as defined in claim 1, wherein the holding element acts at least on one section of the feed-through member.

13. Cable feed-through as defined in claim 1, wherein the at least one holding element forms supporting surfaces for a receiving means for the cable feed-through.

14. Cable feed-through as defined in claim 13, wherein the supporting surfaces are arranged on the outer contour of the at least one holding element.

15. Cable feed-through as defined in claim 1, wherein the sealing element comprises sealing rings bearing inner sealing surfaces adapted to abut on the cable sheath.

16. Cable feed-through as defined in claim 15, wherein the sealing element comprises several sealing rings arranged at a distance from one another.

17. Cable feed-through as defined in claim 1, wherein the sealing element parts have at least one of recesses and projections engaging in one another.

18. Cable feed-through as defined in claim 17, wherein each of the sealing element parts has at least one recess and at least one projection.

19. Cable feed-through as defined in claim 1, wherein the sealing element parts are designed such that their assembly to form the sealing element leads to a deformation of the elastic material forming the sealing element parts.

20. Cable feed-through as defined in claim 1, wherein each sealing element is assembled from identical sealing element parts.

21. Cable feed-through as defined in claim 1, wherein the sealing element parts are designed to be mirror symmetric to a central axis.

22. Cable feed-through as defined in claim 1, wherein the sealing element parts are designed to be mirror symmetric to a transverse axis.

23. Cable feed-through as defined in claim 1, wherein the sealing element parts are adapted to be connected to one another by way of form locking.

24. Cable feed-through as defined in claim 1, wherein each holding element is assembled from identical holding element parts.

25. Cable feed-through as defined in claim 24, wherein:
the at least one holding element comprises two holding elements, and
both holding elements of the cable feed-through are assembled from identical holding element parts.

26. Cable feed-through as defined in claim 1, wherein the sealing element parts are of an identical design.

27. Cable feed-through, comprising:
an elastic sealing element having at least one cable feed-through channel, the elastic sealing element being provided with an outer sealing surface for the cable feed-through, the elastic sealing element being assembled from two sealing element parts separated by a dividing surface and having a feed-through member comprising the at least one cable feed-through channel, said feed-through member comprising inner sealing surfaces adapted to abut sealingly on at least one cable sheath,
at least one holding element, said holding element acting on the two sealing element parts in such a manner that the inner sealing surfaces abut sealingly on the cable sheath and the sealing element parts abut sealingly on one another with their contact surfaces respectively bordering on the dividing surface,
said at least one holding element having an outer contour corresponding to shell surfaces of a cylinder, said outer contour comprising supporting surfaces on both sides of said outer sealing surface.

28. Cable feed-through as defined in claim 27, wherein the outer sealing surface extends around the elastic sealing element in a closed manner.

29. Cable feed-through as defined in claim 27, wherein the outer sealing surface is arranged on a sealing surface carrier integrally formed on the feed-through member.

30. Cable feed-through as defined in claim 29, wherein the sealing surface carrier extends in a radial direction in relation to the cable feed-through channel in a manner located outwardly in relation to the feed-through member.

31. Cable feed-through as defined in claim 29, wherein the sealing surface carrier projects beyond the at least one holding element in a radial direction in relation to the cable feed-through channel with an outer section bearing the outer sealing surface.

32. Cable feed-through as defined in claim 29, wherein the sealing surface carrier is arranged between two supporting surfaces.

33. Cable feed-through as defined in claim 27, wherein the outer contour is adapted to that of the outer sealing surface of the sealing element.

34. Cable feed-through as defined in claim 27, wherein the outer sealing surface of the sealing element projects beyond supporting surfaces of the at least one holding element in a state of the cable feed-through not acted upon with a force.

35. Cable feed-through system, comprising:
a frame,
at least one cable feed-through being inserted in said frame, said cable feed-through comprising an elastic sealing element having at least one cable feed-through channel and an outer sealing surface, the elastic sealing element being assembled from two sealing element parts separated by a dividing surface and having a feed-through member comprising the at least one cable feed-through channel, said feed-through member comprising inner sealing surfaces adapted to abut sealingly on at least one cable sheath, and at least one holding element, said holding element acting on the two sealing element parts in such a manner that the inner sealing surfaces abut sealingly on the cable sheath and the sealing element parts abut sealingly on one another with their contact surfaces respectively bordering on the dividing surface,
said cable feed-through abutting sealingly on the frame at least partially with the outer sealing surface.

36. Cable feed-through system as defined in claim 35, wherein the at least one cable feed-through is adapted to be fixed in the frame with a positioning projection engaging in a positioning opening.

37. Cable feed-through system as defined in claim 35, wherein several cable feed-throughs are inserted into the frame.

38. Cable feed-through system as defined in claim 35, wherein at least one of the cable feed-throughs abuts with its outer sealing surface partially on the frame and partially on outer sealing surfaces of other ones of the cable feed-throughs.

39. Cable feed-through system as defined in claim 36, wherein the dividing surfaces of cable feed-throughs located next to one another extend transversely to one another.

40. Cable feed-through, comprising:
an elastic sealing element having at least one cable feed-through channel, the elastic sealing element being provided with an outer sealing surface for the cable feed-through, the elastic sealing element being assembled from two sealing element parts separated by a dividing surface and having a feed-through member comprising the at least one cable feed-through channel, said feed-through member comprising inner sealing surfaces adapted to abut sealingly on at least one cable sheath,
at least one holding element, said holding element having an outer contour corresponding to shell surfaces of a cylinder with one of a rectangular or square cross-section, said holding element acting on the two sealing element parts in such a manner that the inner sealing surfaces abut sealingly on the cable sheath and the sealing element parts abut sealingly on one another with their contact surfaces respectively bordering on the dividing surface,
the outer sealing surface of the sealing element projecting beyond the outer contour of the at least one holding element in a state of the cable feed-through not acted on with a force.

* * * * *